United States Patent
Chandra et al.

(10) Patent No.: US 11,102,699 B1
(45) Date of Patent: Aug. 24, 2021

(54) WIRELESS COMMUNICATION RELAY SERVICE OVER MULTIPLE NETWORK TRANSCEIVERS

(71) Applicant: T-MOBILE INNOVATIONS LLC, Overland Park, KS (US)

(72) Inventors: Amrit Kumar Chandra, Ashburn, VA (US); Liang Li, Darnestown, MD (US); Charles Anthony Manganiello, Paola, KS (US); Kristian Kai Johns, Ashburn, VA (US); David Z. Sun, Broadlands, VA (US); Jay Ronald Chernoff, Pawleys Island, SC (US); Neehar Shrikant Kulkarni, Herndon, VA (US); Mayur Shirwadkar, Arlington, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 31 days.

(21) Appl. No.: 16/782,292

(22) Filed: Feb. 5, 2020

(51) Int. Cl.
*H04W 24/06* (2009.01)
*H04W 40/22* (2009.01)
*H04W 40/12* (2009.01)
H04W 88/10 (2009.01)
H04W 84/04 (2009.01)

(52) U.S. Cl.
CPC .......... *H04W 40/22* (2013.01); *H04W 24/06* (2013.01); *H04W 40/12* (2013.01); *H04W 84/047* (2013.01); *H04W 88/10* (2013.01)

(58) Field of Classification Search
CPC ..... H04W 40/22; H04W 24/06; H04W 40/12; H04W 84/047; H04W 88/10
USPC .............................. 370/315, 310.2; 455/11.1
See application file for complete search history.

(56) References Cited

U.S. PATENT DOCUMENTS

| | | | |
|---|---|---|---|
| 8,185,060 B2 | 5/2012 | Agashe et al. | |
| 8,711,768 B2 | 4/2014 | Viswanath | |
| 8,948,085 B2 | 2/2015 | Barbieri et al. | |
| 8,976,662 B2 | 3/2015 | Somasundaram et al. | |
| 9,125,133 B2 | 9/2015 | Ji et al. | |
| 9,191,098 B2 | 11/2015 | Kazmi et al. | |
| 9,867,114 B2 | 1/2018 | Fang | |
| 9,949,192 B1 | 4/2018 | Saleh et al. | |
| 10,298,313 B2 | 5/2019 | Liu et al. | |
| 10,972,160 B1* | 4/2021 | Marupaduga | H04W 48/06 |
| 2013/0194948 A1 | 8/2013 | Mallik et al. | |
| 2018/0279202 A1* | 9/2018 | Tenny | H04W 76/14 |
| 2019/0075604 A1* | 3/2019 | Wang | H04W 76/15 |
| 2019/0150150 A1* | 5/2019 | Calin | H04L 43/026 370/329 |
| 2020/0092879 A1* | 3/2020 | Wu | H04W 8/005 |
| 2020/0322230 A1* | 10/2020 | Natal | G06F 9/44505 |

(Continued)

*Primary Examiner* — Danh C Le

(57) ABSTRACT

A wireless communication relay wirelessly serves User Equipment (UEs) with wireless data services. Relay circuitry tests data throughputs over a Fifth Generation New Radio (5GNR) network Transceiver (XCVR), Long Term Evolution (LTE) network XCVR, and wireline network XCVR. The relay circuitry selects sets of network XCVRs for the user XCVRs based on the data throughput testing. The relay circuitry indicates the selected network XCVRs to the user XCVRs. The user XCVRs wirelessly exchange user data with the wireless UEs and exchange the user data with the selected network XCVRs. The selected network XCVRs exchange the user data with one or more data communication networks.

20 Claims, 15 Drawing Sheets

(56) References Cited

U.S. PATENT DOCUMENTS

| | | | |
|---|---|---|---|
| 2021/0044565 A1* | 2/2021 | Moreno | H04L 63/0236 |
| 2021/0064996 A1* | 3/2021 | Wang | G06N 3/04 |
| 2021/0075522 A1* | 3/2021 | Pettygrove | G08B 7/06 |
| 2021/0080523 A1* | 3/2021 | Derat | H04B 1/3838 |
| 2021/0112034 A1* | 4/2021 | Sundararajan | H04L 49/25 |
| 2021/0114616 A1* | 4/2021 | Altman | G01C 21/3848 |

* cited by examiner

WIRELESS COMMUNICATION RELAY SERVICE OVER MULTIPLE NETWORK TRANSCEIVERS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN). The wireless access nodes are also coupled to their corresponding communication networks over wireline backhaul links.

The wireless communication networks are deploying wireless relays to extend the coverage of their wireless data services. The wireless relays have user transceivers that wirelessly serve the wireless user devices. The wireless relays have network transceivers that are wirelessly served by the wireless access nodes. The wireless backhaul links give the wireless relays more location options than the wireless access nodes which use wireline backhaul links. In the wireless relays, the user transceivers and the network transceivers may use WIFI, LTE, 5GNR, LP-WAN, and the like. Some wireless relays also have wireline transceivers that use communication protocols like IEEE 802.3 (ETHERNET) and Data Over Cable System Interface Specification (DOCSIS) to obtain data services from a wireline Internet Service Provider (ISP).

The wireless relays select their backhaul links based on factors like performance, cost, and user protocol. Unfortunately, backhaul selection in wireless relays remains inefficient given the large variety of available transceivers and protocols. Moreover, the wireless relays do not effectively select multiple backhaul transceivers for individual user transceivers based on empirical testing.

TECHNICAL OVERVIEW

A wireless communication relay wirelessly serves User Equipment (UEs) with wireless data services. Relay circuitry tests data throughputs over a Fifth Generation New Radio (5GNR) network Transceiver (XCVR), Long Term Evolution (LTE) network XCVR, and wireline network XCVR. The relay circuitry selects sets of network XCVRs for the user XCVRs based on the data throughput testing. The relay circuitry indicates the selected network XCVRs to the user XCVRs. The user XCVRs wirelessly exchange user data with the wireless UEs and exchange the user data with the selected network XCVRs. The selected network XCVRs exchange the user data with one or more data communication networks.

DETAILED DESCRIPTION

Figure 1:
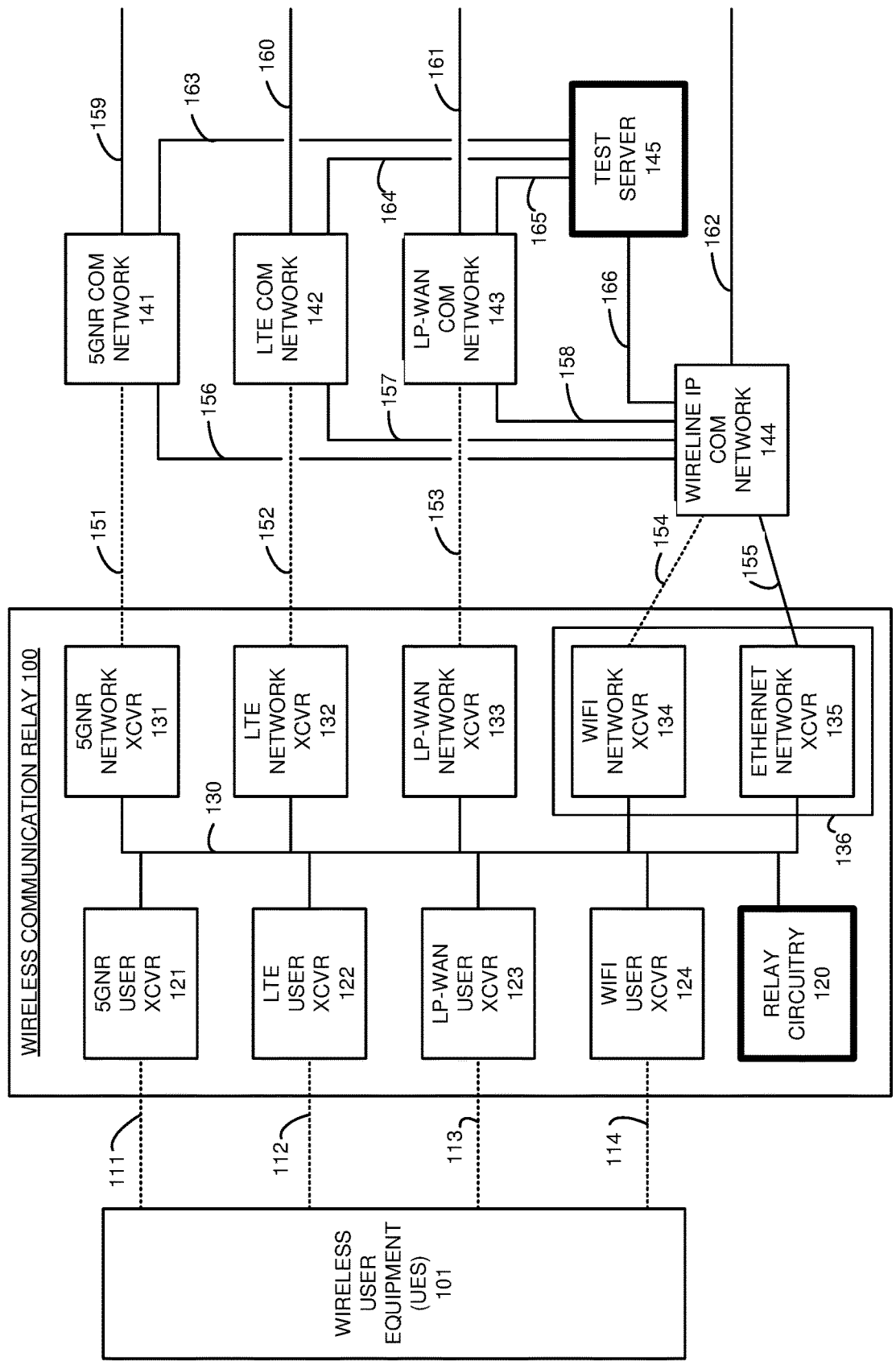
FIG. 1 illustrates a wireless communication relay to wirelessly serve User Equipment (UEs) with wireless data services over multiple network Transceivers (XCVRs).

FIG. 1 illustrates wireless communication relay 100 to wirelessly serve User Equipment (UEs) 101 with a wireless data service over network Transceivers (XCVRs) 131-135. Wireless communication relay 100 comprises relay circuitry 120, user XCVRs 121-124, network XCVRs 131-135, and bus circuitry 130. User XCVRS 121-124 wirelessly exchange user data with UEs 101 over wireless links 111-114 to deliver the wireless data service. Network XCVRs 131-135 exchange the user data with communication networks 141-144 over data links 151-158. Communication networks 141-144 exchange the user data with various data systems over data links 159-162. Relay circuitry 120 and test server 145 exchange test data for throughput tests over bus circuitry 130, network XCVRs 131-135, data links 151-158, communication networks 141-144, data links 151-158, and data links 163-166.

Fifth Generation New Radio (5GNR) is used by wireless 5GNR link 111, 5GNR user XCVR 121, 5GNR network XCVR 131, wireless 5GNR link 151, and 5GNR communication network 141. Long Term Evolution (LTE) is used by wireless LTE link 112, LTE user XCVR 122, LTE network XCVR 132, wireless LTE link 152, and LTE communication network 142. Low-Power Wide Area Network (LP-WAN) is used by wireless LP-WAN link 113, LP-WAN user XCVR 123, LP-WAN network XCVR 133, wireless LP-WAN link 153, and LP-WAN communication network 143. Institute of Electrical and Electronic Engineers (IEEE) 802.11 (WIFI) is used by wireless WIFI link 114, WIFI user XCVR 124, WIFI network XCVR 134, wireless WIFI link 154, and wireline Internet Protocol (IP) communication network 144. IEEE 802.3 (ETHERNET) is used by ETHERNET network XCVR 135, ETHERNET data link 155, and wireline IP communication network 144.

Together, WIFI network XCVR 134 and ETHERNET network XCVR 135 comprise wireline network XCVR 136 which communicates with wireline IP communication network 144 over links 154-155. In some examples, Data Over Cable System Interface Specification (DOCSIS) is used by wireline network XCVR 136, data link 155, and wireline IP communication network 144. Some of XCVRs 121-124 and 131-135 may not be present in all examples. For example, both LP-WAN XCVRs 123 and 133 could be omitted from wireless communication relay 100. In another examples, user XCVRs 123-124 are omitted from relay 100. In yet other examples, network XCVRs 133 and 135 are from relay 100. Various combinations of user and network XCVRs could be included in relay 100 as long as there are multiple network XCVRs.

Wireless links 111-114 and 151-154 use frequencies in low-band, mid-band, high-band, or some other part or the wireless electromagnetic spectrum. Data links 156-166 use ETHERNET, IP, Time Division Multiplex (TDM), and/or some other data communication protocol. Communication links 151-166 may comprise intermediate network elements. For example, WIFI link 154 may comprise a wireless WIFI link to an IP router and a wireline DOCSIS link from the IP router to wireline IP communication network 144

UEs 101 use one or more of 5GNR, LTE, LP-WAN, and WIFI. For example, some UEs may only use LP-WAN while other UEs use 5GNR, LTE, and WIFI but not LP-WAN. UEs 101 might be phones, computers, robots, vehicles, or some other data appliances with wireless communication circuitry. UEs 101 comprise radios and user circuitry which are coupled over bus circuitry. The radios comprise antennas, filters, amplifiers, analog-to-digital interfaces, microprocessors, memory, software, XCVRs, bus circuitry, and the like. The user circuitry comprises microprocessors, memory, software, XCVRs, bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating system, user applications, and network applications.

XCVRs 121-124 and 131-134 comprise radios and Baseband Units (BBUs) which are coupled over bus circuitry. The radios comprise antennas, filters, amplifiers, analog-to-digital interfaces, microprocessors, memory, software, XCVRs, bus circuitry, and the like. The BBUs comprise microprocessors, memory, software, XCVRs, bus circuitry, and the like. The microprocessors comprise DSP, CPUs, GPUs, ASICs, and/or the like. The memories comprise RAM, flash circuitry, disk drives, and/or the like. The memories store software like operating systems and network applications.

Relay circuitry 120 comprises a microprocessor, memory, software, and bus interface. The microprocessor comprises a CPU, GPU, ASIC, and/or the like. The memory comprises RAM, flash circuitry, disk drive, and/or the like. The memory stores software like operating system and network applications for throughput testing and backhaul control. Bus circuitry 130 comprises metallic links, bus controllers, and the like.

Communication networks 141-144 and test server 145 comprise microprocessors, memory, software, XCVRs, and bus circuitry. The microprocessors comprise CPU, GPUs, ASICs, and/or the like. The memories comprise RAM, flash circuitry, disk drives, and/or the like. The memories store software like operating systems, virtual layers, and network applications. Test server 145 has network applications for throughput testing. In networks 141-144, exemplary network applications comprise network controllers, data routers, network gateways, application servers, and the like.

In operation, relay circuitry 120 measures the different data throughputs over 5GNR network XCVR 131, LTE network XCVR 132, LP-WAN network XCVR 133, WIFI network XCVR 134, and ETHERNET network XCVR 135. The throughputs are typically measured in average bytes per second as measured over a given time period. The 5GNR throughput testing traverses relay circuitry 120, bus circuitry 130, 5GNR network XCVR 131, 5GNR wireless link 151, 5GNR communication network 141, data link 163, and test server 145. The LTE throughput testing traverses relay circuitry 120, bus circuitry 130, LTE network XCVR 132, LTE wireless link 152, LTE communication network 142, data link 164, and test server 145. The LP-WAN throughput testing traverses relay circuitry 120, bus circuitry 130, LP-WAN network XCVR 133, LP-WAN wireless link 153, LP-WAN communication network 143, data link 165, and test server 145.

Some of the WIFI throughput testing may traverse relay circuitry 120, bus circuitry 130, WIFI network XCVR 134, wireless WIFI link 154, wireline IP communication network 144, data link 156, 5GNR communication network 141 (including an N3 Interworking Function (N3IWF)), data link 163, and test server 145. Some of the WIFI throughput testing may traverse relay circuitry 120, bus circuitry 130, WIFI network XCVR 134, wireless WIFI link 154, wireline IP communication network 144, data link 157, LTE communication network 142 (including an Evolved Packet Data Gateway (ePDG)), data link 164, and test server 145. Some of the WIFI throughput testing may traverse relay circuitry 120, bus circuitry 130, WIFI network XCVR 134, wireless WIFI link 154, wireline IP communication network 144, data link 157, LP-WAN communication network 143, data link 165, and test server 145. Some of the WIFI testing measures throughputs for a Local Breakout (LBO) service that traverses relay circuitry 120, bus circuitry 130, WIFI network XCVR 134, wireless WIFI link 154, wireline IP communication network 144 (including an LBO IP router), data link 166, and test server 145.

Some of the ETHERNET throughput testing may traverse relay circuitry 120, bus circuitry 130, ETHERNET network XCVR 135, ETHERNET link 155, wireline IP communication network 144, data link 156, 5GNR communication network 141, data link 163, and test server 145. Some of the ETHERNET throughput testing may traverse relay circuitry 120, bus circuitry 130, ETHERNET network XCVR 135, ETHERNET link 155, wireline IP communication network 144, data link 157, LTE communication network 142, data link 164, and test server 145. Some of the ETHERNET throughput testing may traverse relay circuitry 120, bus circuitry 130, ETHERNET network XCVR 135, ETHERNET link 155, wireline IP communication network 144, data link 157, LP-WAN communication network 143, data link 165, and test server 145. Some of the ETHERNET testing measures throughputs for an LBO service that traverses relay circuitry 120, bus circuitry 130, ETHERNET network XCVR 135, ETHERNET link 155, wireline IP communication network 144 (including an LBO IP router), data link 166, and test server 145.

Relay circuitry 120 selects a set of network XCVRs 131-135 based on the data throughput testing. For example, individual network XCVRs 131-135 may be selected when their individual data throughput exceeds an individual threshold. Some network XCVRs may support other network XCVRs. For example, WIFI network XCVR 134 may support LP-WAN network XCVR when LP-WAN throughput falls below one threshold and WIFI throughput exceeds another threshold. In another example, ETHERNET LBO may support ETHERNET 5GNR, when the ETHERNET 5GNR throughput falls below a threshold and ETHERNET LBO throughput exceeds another threshold. Relay circuitry 120 may host a data structure that is entered with the results of the throughput testing and that yields a custom set of network XCVRs 131-135 (and options where applicable) for each of user XCVRs 121-124. Relay circuitry 120 signals user XCVRs 121-124 to indicate their selected set of network XCVRs 131-135 (including options like ETHERNET/LBO or WIFI/LTE). User XCVRs 121-124 may share the same set of network XCVRs 131-135 or each of user XCVRs 121-124 may each have their own custom set of network XCVRs 131-135.

User XCVRs 121-124 wirelessly exchange user data with UEs 101. When 5GNR network XCVR 131 is selected for user XCVRs 121-124, those user XCVRs exchange their user data with 5GNR network XCVR 131 over bus circuitry 130. 5GNR network XCVR 131 wirelessly exchanges the user data with 5GNR communication network 141 over 5GNR link 151, and 5GNR communication network 141 exchanges the user data with other data systems over data link 159. When LTE network XCVR 132 is selected for user XCVRs 121-124, those user XCVRs exchange their user data with LTE network XCVR 132 over bus circuitry 130. LTE network XCVR 132 wirelessly exchanges the user data with LTE communication network 142 over LTE link 152, and LTE communication network 142 exchanges the user data with other data systems over data link 160. When LP-WAN network XCVR 133 is selected for user XCVRs 121-124, those user XCVRs exchange their user data with LP-WAN network XCVR 133 over bus circuitry 130. LP-WAN network XCVR 133 wirelessly exchanges the user data with LP-WAN communication network 143 over LP-WAN link 153, and LP-WAN communication network 143 exchanges the user data with other data systems over data link 161.

When WIFI network XCVR 134 is selected for user XCVRs 121-124, the selection includes a network option for WIFI like 5GNR, LTE, LP-WAN, or LBO. When WIFI/5GNR is selected, the user XCVRs exchange their user data with WIFI network XCVR 134 over bus circuitry 130. WIFI network XCVR 134 wirelessly exchanges the user data with wireline communication network 144 over WIFI link 154, wireline communication network 144 exchanges the user data with 5GNR communication network 141 over data link 156, and 5GNR communications network 141 exchanges the user data with other data systems over data link 159. When WIFI/LTE is selected, the user XCVRs exchange their user data with WIFI network XCVR 134 over bus circuitry 130. WIFI network XCVR 134 wirelessly exchanges the user data with wireline communication network 144 over WIFI link 154, wireline communication network 144 exchanges the user data with LTE communication network 142 over data link 157, and LTE communications network 142 exchanges the user data with other data systems over data link 160. When WIFI/LP-WAN is selected, the user XCVRs exchange their user data with WIFI network XCVR 134 over bus circuitry 130. WIFI network XCVR 134 wirelessly exchanges the user data with wireline communication network 144 over WIFI link 154, wireline communication network 144 exchanges the user data with LP-WAN communication network 143 over data link 158, and LP-WAN communications network 143 exchanges the user data with other data systems over data link 161. When WIFI/LBO is selected, the user XCVRs exchange their user data with WIFI network XCVR 134 over bus circuitry 130. WIFI network XCVR 134 wirelessly exchanges the user data with wireline communication network 144 over WIFI link 154, and wireline communication network 144 exchanges the user data with other data systems over data link 162.

When ETHERNET network XCVR 135 is selected for user XCVRs 121-124, the selection includes a network option. When ETHERNET/5GNR is selected, the user XCVRs exchange their user data with ETHERNET network XCVR 135 over bus circuitry 130. ETHERNET network XCVR 135 exchanges the user data with wireline communication network 144 over ETHERNET link 155, wireline communication network 144 exchanges the user data with 5GNR communication network 141 over data link 156, and 5GNR communications network 141 exchanges the user data with other data systems over data link 159. When ETHERNET/LTE is selected, the user XCVRs exchange their user data with WIFI network XCVR 134 over bus circuitry 130. ETHERNET network XCVR 135 exchanges the user data with wireline communication network 144 over ETHERNET link 155, wireline communication network 144 exchanges the user data with LTE communication network 142 over data link 157, and LTE communications network 142 exchanges the user data with other data systems over data link 160. When ETHERNET/LP-WAN is selected, the user XCVRs exchange their user data with ETHERNET network XCVR 135 over bus circuitry 130. ETHERNET network XCVR 135 exchanges the user data with wireline communication network 144 over ETHERNET link 155, wireline communication network 144 exchanges the user data with LP-WAN communication network 143 over data link 158 and LP-WAN communications network 143 exchanges the user data with other data systems over data link 161. When ETHERNET/LBO is selected, the user XCVRs exchange their user data with ETHERNET network XCVR 135 over bus circuitry 130. ETHERNET network XCVR 135 wirelessly exchanges the user data with wireline communication network 144 over ETHERNET link 155 and wireline communication network 144 exchanges the user data with other data systems over data link 162.

Relay circuitry 120 may indicate data allocations by percent or data amount on the uplink and/or downlink between user XCVRs 121-124 and network XCVRS 131-135. For example, WIFI user XCVR 124 may send 30% of uplink user data over 5GNR network XCVR 131 and send 70% of uplink user data over LTE network XCVR 132. WIFI user XCVR 124 may receive 20% of downlink user data over 5GNR network XCVR 131 and receive 80% of downlink user data from LTE network XCVR 132. Relay circuitry 120 may indicate the data allocations by data service between user XCVRs 121-124 and network XCVRs 131-135. For example, 5GNR user XCVR 121 may send internet-access data over 5GNR network XCVR 131 and may send media-conference data over LTE network XCVR 132.

To interwork between different communication protocols like 5GNR and WIFI, user XCVRs 121-124 and network XCVRs 131-135 may directly translate between signaling and data for 5GNR, LTE, LP-WAN, WIFI, and ETHERNET. For example, 5GNR user XCVR 131 may translate 5GNR signaling and data into WIFI signaling and data for WIFI network XCVR 134. LP-WAN network XCVR 133 may translate LP-WAN signaling and data into LTE signaling and data for LTE user XCVR 122. Alternatively, user XCVRs 121-124 and network XCVRs 131-135 may exchange user signaling and data as they do with the operating systems and the user applications that they serve. For example, 5GNR network XCVR 131 may serve WIFI user XCVR 124 like an operating system/user application in a 5GNR device. LP-WAN user XCVR 133 may serve ETHERNET network XCVR 135 like an operating system/user application in an LP-WAN device.

Figure 2:
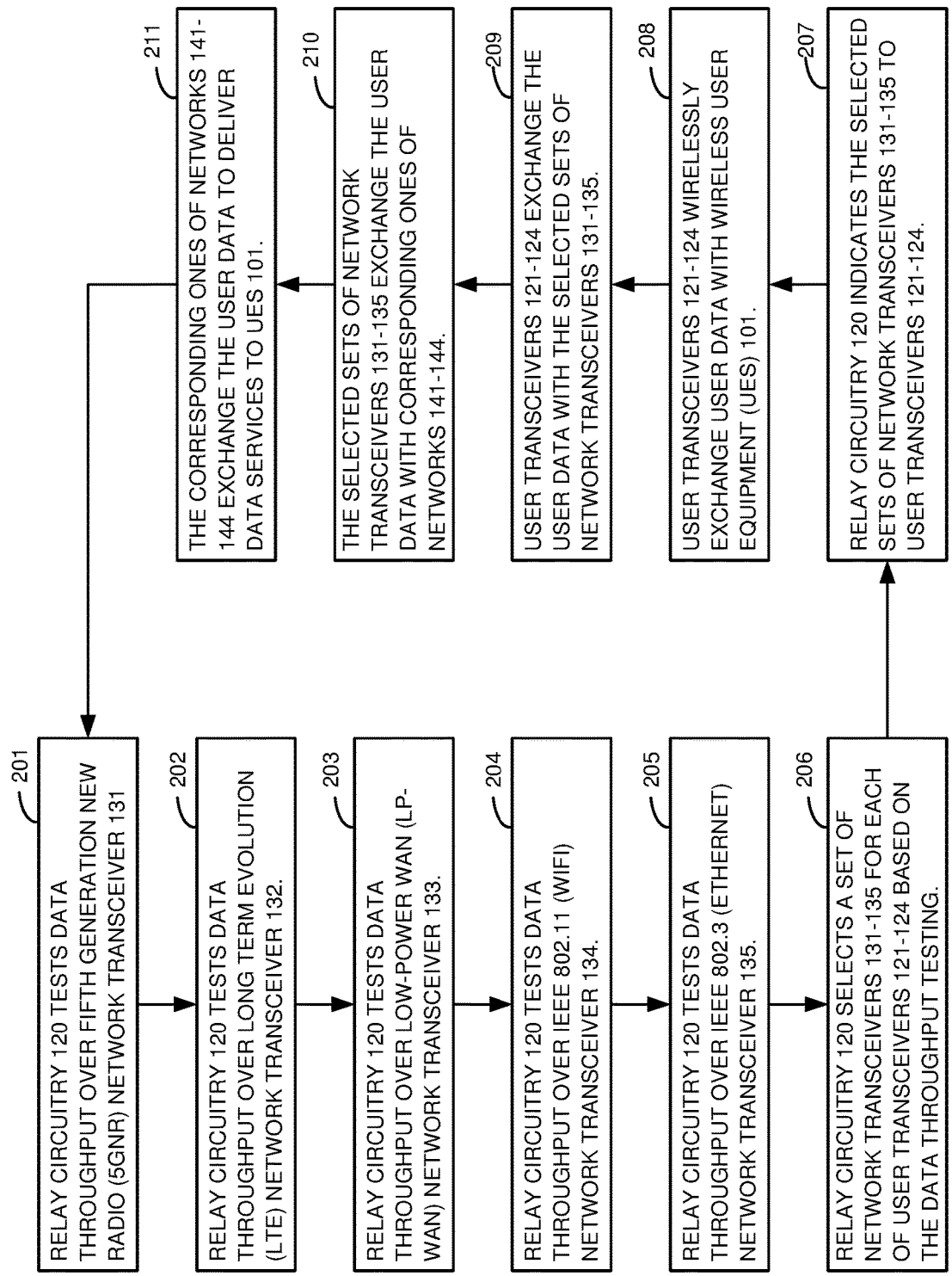
FIG. 2 illustrates the operation of the wireless communication relay to wirelessly serve the UEs with the wireless data services over the network XCVRs.

FIG. 2 illustrates the operation of wireless communication relay 100 to wirelessly serve UEs 101 with the wireless data service over network XCVRs 131-135. Relay circuitry 120 tests data throughput over 5GNR network XCVR 131 (201). For example, relay circuitry 120 and test server 145 may exchange test data over 5GNR XCVR 131 and measure average bytes per second on the uplink and on the downlink. Relay circuitry 120 tests data throughput over LTE network XCVR 132 (202). Relay circuitry 120 tests data throughput over LP-WAN network XCVR 133 (203). Relay circuitry 120 tests data throughput over WIFI network XCVR 134, and the tests may include separate tests for WIFI/5GNR, WIFI/LTE, WIFI/LP-WAN, and WIFI/LBO (204). Relay circuitry 120 tests data throughput over ETHERNET network XCVR 135, and the tests may include separate tests for ETHERNET/5GNR, ETHERNET/LTE, ETHERNET/LP-WAN, and ETHERNET/LBO (205).

Relay circuitry 120 selects a set of network XCVRs 131-135 for each of user XCVRS 121-124 (206). Thus, relay circuitry 120 customizes a set of network XCVRs 131-135 for each user XCVR. Relay circuitry 120 may enter the measured throughputs into a hosted relay application that separately compares the network XCVR throughputs to thresholds in a prioritized order for each user XCVR and then separately selects the network XCVRs for each user XCVR that exceed custom throughput and priority filters for the individual user XCVR. Relay circuitry 120 signals user XCVRs 121-124 to indicate their individual set of network XCVRs 131-135 (207). User XCVRs 121-124 wirelessly exchange user data with UEs 101 (208). User XCVRs 121-124 exchange the user data with their selected sets of network XCVR 131-135 (209). For example, 5GNR user XCVR 121 may exchange user data with 5GNR network XCVR 131 and ETHERNET network XCVR 135, while LP-WAN user XCVR 123 exchanges user data with LP-WAN network XCVR 133 and WIFI network XCVR 134. The selected sets of network XCVR 131-135 exchange the user data with their corresponding communication networks 141-144 (210). The corresponding communication networks 141-144 exchange the user data to deliver the data services to UEs 101 (211). The operation repeats (201).

Figure 3:
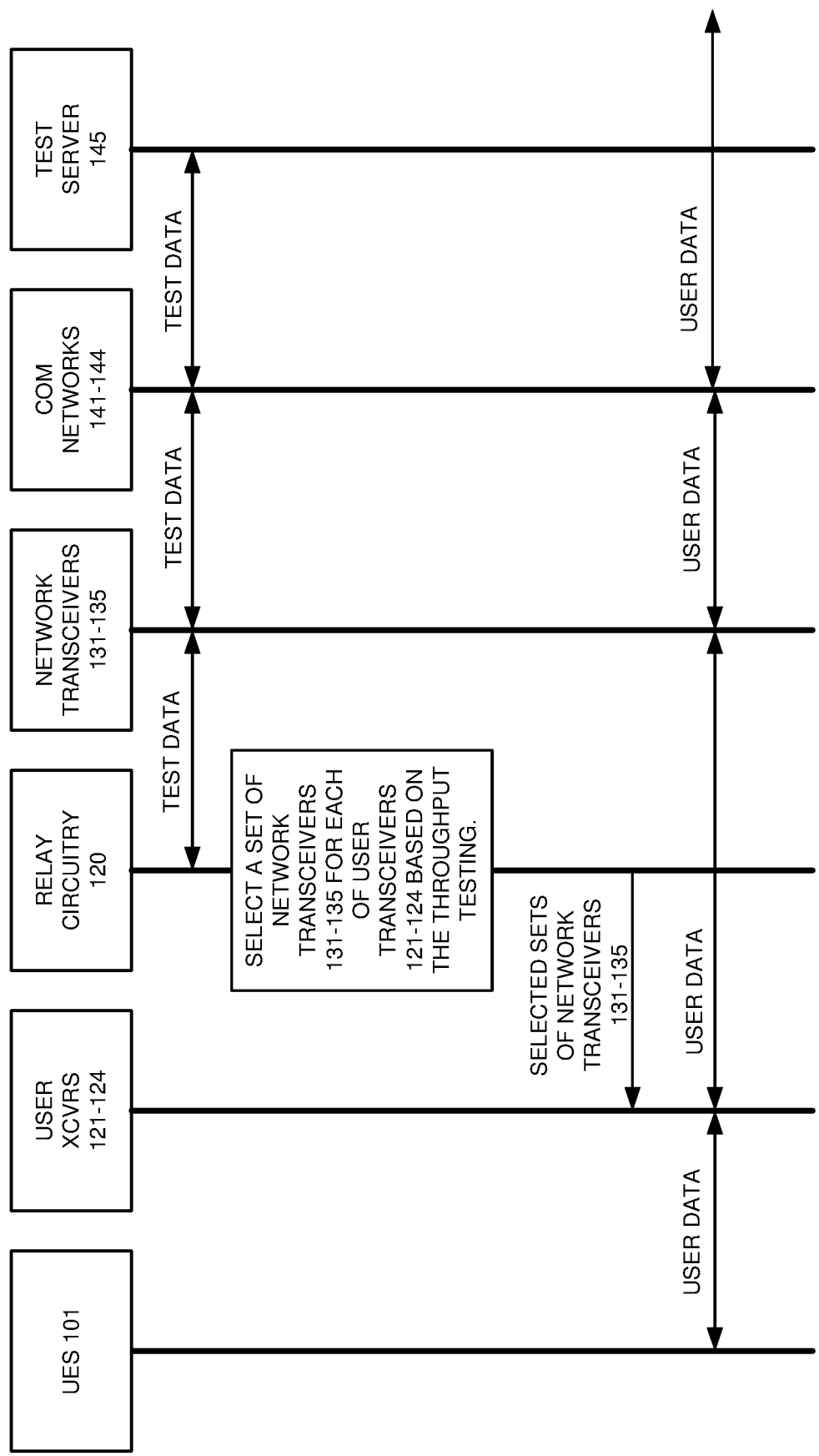
FIG. 3 illustrates the operation of the wireless communication relay to wirelessly serve the UEs with the wireless data services over the network XCVRs.

FIG. 3 illustrates the operation of wireless communication relay 100 to wirelessly serve UEs 101 with the wireless data service over network XCVRs 131-135. Relay circuitry 120 exchanges test data with network XCVRs 131-135. Network XCVRs 131-135 exchange the test data with communication networks 141-144. Communication networks 141-144 exchange the test data with test server 145. Relay circuitry determines individual data throughput metrics for individual network XCVRs 131-135. Relay circuitry 120 selects sets of network XCVRs 131-135 for user XCVRS 121-124 based on the throughput testing. Relay circuitry 120 signals the selected sets of network XCVRs 131-135 to user XCVRs 121-124.

UEs 101 wirelessly exchange user data with user XCVRs 121-124. User XCVRs 121-124 exchange the user data with network XCVRs 131-135 based on the signaling from relay circuitry 120. Network XCVRs 131-135 exchange the user data with communication networks 141-144 as directed by user XCVRs 121-124. Communication networks 141-144 exchange the user data with various data systems to deliver the data service to UEs 101.

Advantageously, wireless communication relay 100 efficiently and effectively selects sets of network transceivers 131-135 for individual user transceivers 121-124 based on the data throughput testing.

Figure 4:
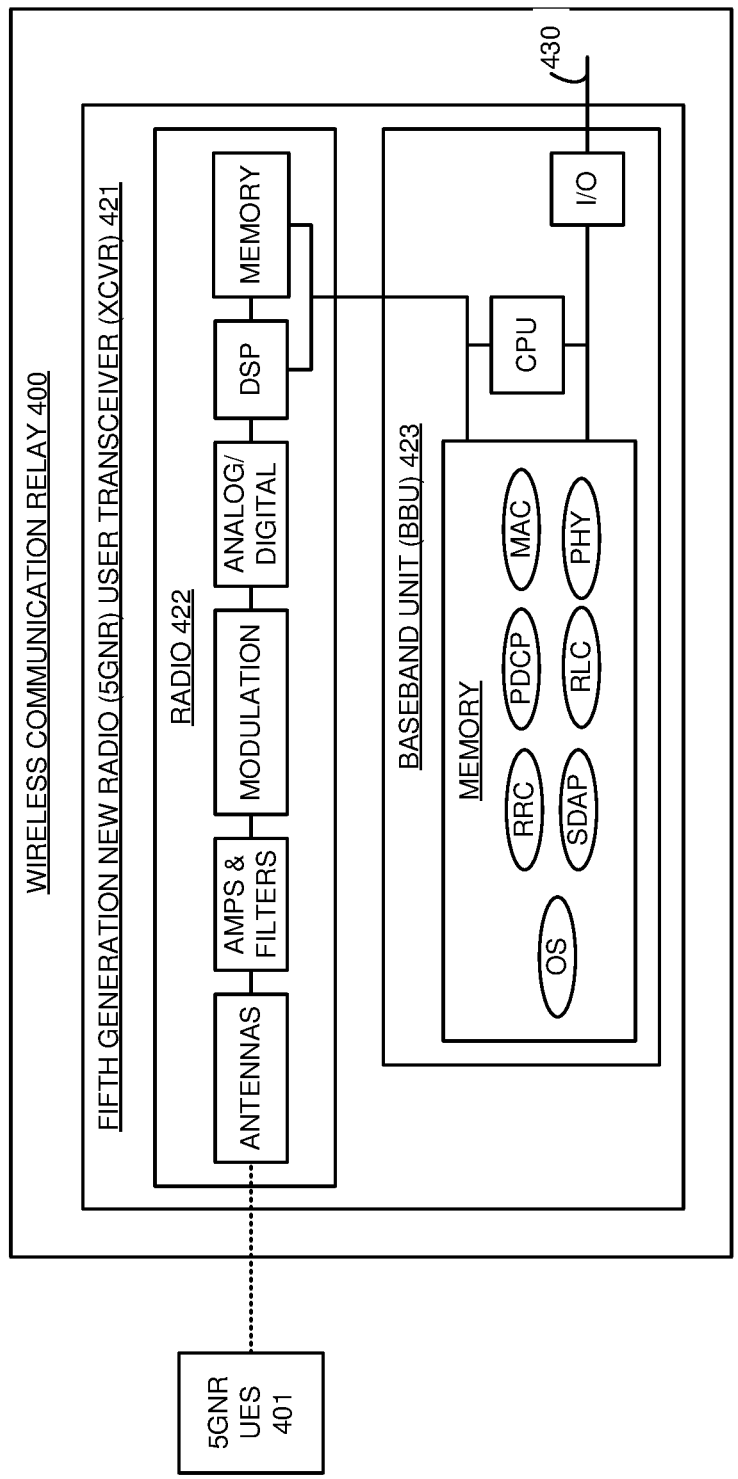
FIG. 4 illustrates a Fifth Generation New Radio (5GNR) user XCVR in a wireless communication relay.

FIG. 4 illustrates Fifth Generation New Radio (5GNR) user XCVR 421 in wireless communication relay 400. 5GNR user XCVR 421 is an example of 5GNR user XCVR 121, although XCVR 121 may differ. 5GNR user XCVR 421 comprises radio 422 and Baseband Unit (BBU) 423. Radio 422 comprises antennas, amplifiers, filters, modulation, analog-to-digital interfaces, DSP, and memory that are coupled over bus circuitry. BBU 423 comprises memory, Central Processing Units (CPU), and data Input/Output (I/O) that are coupled over bus circuitry. In wireless communication relay 400, 5GNR user XCVR 421 communicates over bus circuitry 430 with a set of network XCVRs as directed by test circuitry in relay 400. 5GNR UEs 401 are wirelessly coupled to the antennas in radio 422 over 5GNR links. Radio 422 and BBU 423 are coupled over bus circuitry. The BBU I/O is coupled to bus circuitry 430 which is coupled to other elements in wireless communication relay 400 like relay test circuitry and network XCVRs. The BBU memory stores an operating system (OS), Physical Layer (PHY), Media Access Control (MAC), Radio Link Control (RLC), Packet Data Convergence Protocol (PDCP), Radio Resource Control (RRC) and Service Data Adaptation Protocol (SDAP). The CPU executes the PHY, MAC, RLC, PDCP, RRC, and SDAP to drive the exchange of user data and network signaling between bus circuitry 430 and radio 422.

In radio 422, the antennas receive wireless 5GNR signals from 5G UEs 401 that transport Uplink (UL) 5GNR signaling and UL 5GNR data. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSP. The DSP recovers UL 5GNR symbols from the UL digital signals. In BBU 423, the CPU executes the network applications to process the UL 5GNR symbols and recover the UL 5GNR signaling and UL 5GNR data. The CPU executes the RRC to process the UL 5GNR signaling and DL network signaling to generate new UL network signaling and new DL 5GNR signaling. The RRC transfers the new UL network signaling to the selected network XCVRs in relay 400 over bus circuitry 430. The SDAP interworks between 5GNR data and user data for the UL and DL. The SDAP transfers the UL user data to the selected network XCVRs in relay 400 over bus circuitry 430.

In BBU 423, the data I/O receives the DL network signaling and user data from the selected network XCVRs over bus circuitry 430. The BBU CPU executes the network applications to process the new DL network signaling and the DL user data to generate corresponding DL 5GNR symbols that carry corresponding DL 5GNR signaling and DL 5GNR data. In radio 422, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-ofband energy. The filters transfer the filtered DL signals through duplexers to the antennas. The electrical DL signals drive the antennas to emit corresponding wireless 5GNR signals that transport the DL 5GNR signaling and DL 5GNR data to 5GNR UEs 401.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 5:
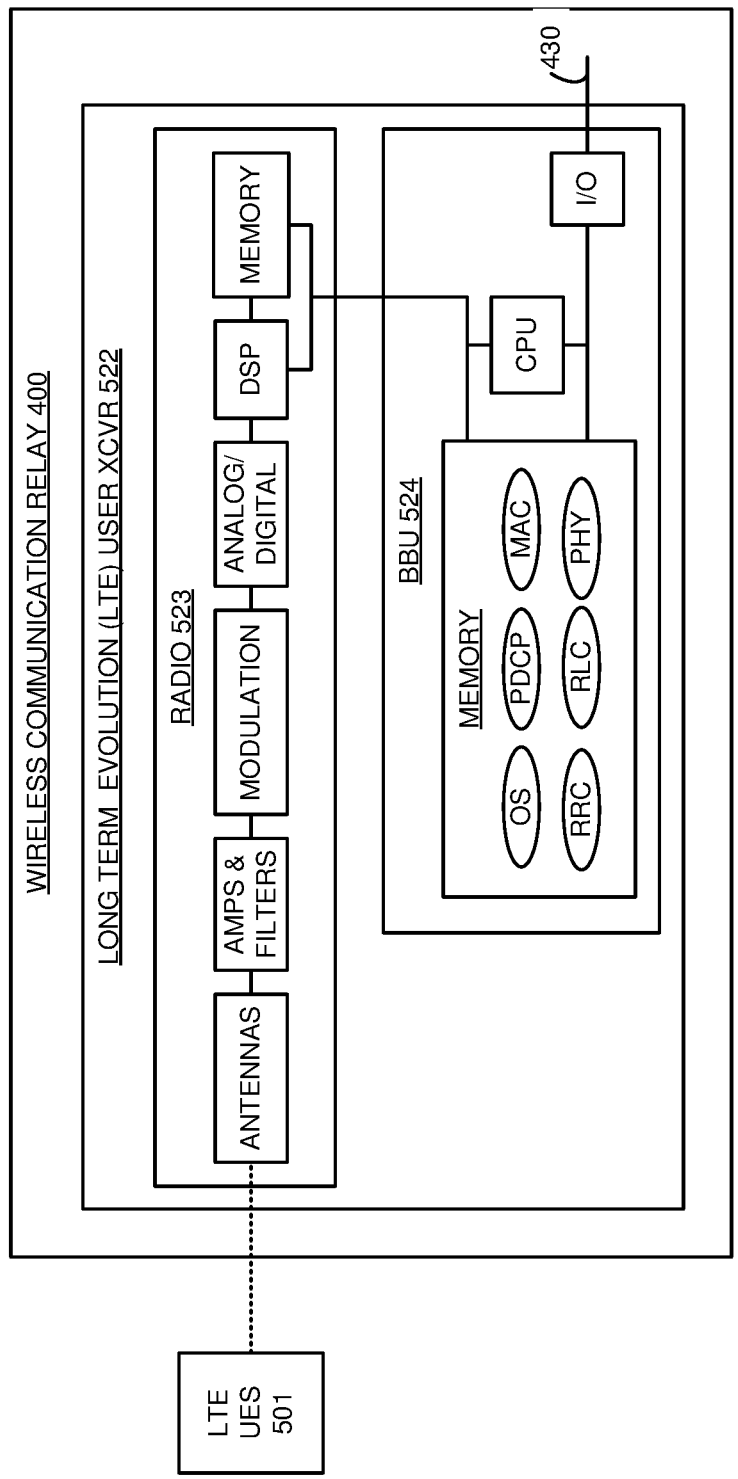
FIG. 5 illustrates a Long Term Evolution (LTE) user XCVR in the wireless communication relay.

FIG. 5 illustrates Long Term Evolution (LTE) user XCVR 522 in wireless communication relay 400. LTE user XCVR 522 is an example of 5GNR user XCVR 122, although XCVR 122 may differ. LTE user XCVR 522 comprises radio 523 and BBU 524. Radio 523 comprises antennas, amplifiers, filters, modulation, analog-to-digital interfaces, DSP, and memory that are coupled over bus circuitry. BBU 524 comprises memory, CPU, and data I/O that are coupled over bus circuitry. In wireless communication relay 400, LTE user XCVR 522 communicates over bus circuitry 430 with a set of network XCVRs as directed by test circuitry in relay 400. LTE UEs 501 are wirelessly coupled to the antennas in radio 523 over LTE links. Radio 523 and BBU 524 are coupled over bus circuitry. The BBU I/O is coupled to bus circuitry 430 which is coupled to other elements in wireless communication relay 400 like relay test circuitry and network XCVRs. The BBU memory stores an operating system, PHY, MAC, RLC, PDCP, and RRC. The CPU executes the PHY, MAC, RLC, PDCP, and RRC to drive the exchange of user data and network signaling between bus circuitry 430 and radio 523.

In radio 523, the antennas receive wireless LTE signals from LTE UEs 501 that transport UL LTE signaling and UL LTE data. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSP. The DSP recovers UL LTE symbols from the UL digital signals. In BBU 524, the CPU executes the network applications to process the UL LTE symbols and recover the UL LTE signaling and UL LTE data. The CPU executes the RRC to process the UL LTE signaling and DL network signaling to generate new UL network signaling and new DL LTE signaling. The RRC transfers the new UL network signaling to the selected network XCVRs over bus circuitry 430. The PDCP interworks between LTE data and user data for the UL and DL. The PDCP transfers the UL user data to the selected network XCVRs over bus circuitry 430.

The BBU I/O receives the DL network signaling and user data from the selected network XCVRS over bus circuitry 430. The BBU CPU executes the network applications to process the DL network signaling and the DL user data to generate corresponding DL LTE symbols that carry corresponding DL LTE signaling and DL LTE data. In radio 523, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling and DL LTE data to LTE UEs 501.

Figure 6:
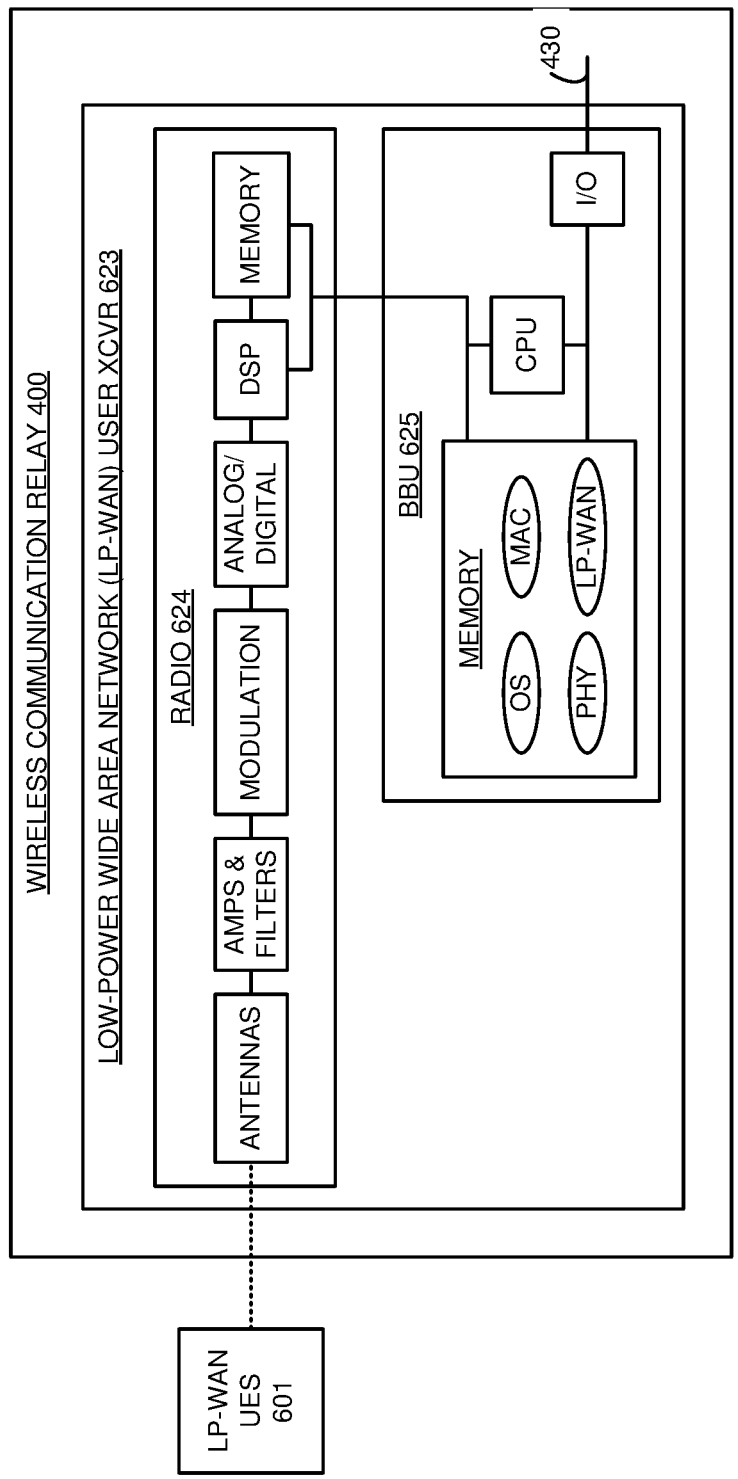
FIG. 6 illustrates a Low-Power Wide Area Network (LP-WAN) user XCVR in the wireless communication relay.

FIG. 6 illustrates Low-Power Wide Area Network (LP-WAN) user XCVR 623 in wireless communication relay 400. LP-WAN user XCVR 623 is an example of LP-WAN user XCVR 123, although XCVR 123 may differ. LP-WAN user XCVR 623 comprises radio 624 and BBU 625. Radio 624 comprises antennas, amplifiers, filters, modulation, analog-to-digital interfaces, DSP, and memory that are coupled over bus circuitry. BBU 625 comprises memory, CPU, and data I/O that are coupled over bus circuitry. In wireless communication relay 400, LP-WAN user XCVR 623 communicates over bus circuitry 430 with a set of network XCVRs as directed by test circuitry in relay 400. LP-WAN UEs 601 are wirelessly coupled to the antennas in radio 624 over LP-WAN links. Radio 624 and BBU 625 are coupled over bus circuitry. The BBU I/O is coupled to bus circuitry 430 which is coupled to other elements in wireless communication relay 400 like relay test circuitry and network XCVRs. The BBU memory stores an operating system, PHY, MAC, and LP-WAN application. The CPU executes the PHY, MAC, and LP-WAN application to drive the exchange of user data and network signaling between bus circuitry 430 and radio 624.

In radio 624, the antennas receive wireless LP-WAN signals from LP-WAN UEs 601 that transport UL LP-WAN signaling and UL LP-WAN data. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSP. The DSP recovers UL LP-WAN symbols from the UL digital signals. In BBU 625, the CPU executes the network applications to process the UL LP-WAN symbols and recover the UL LP-WAN signaling and UL LP-WAN data. The CPU executes the LP-WAN application to process the UL LP-WAN signaling and DL network signaling to generate new UL network signaling and new DL LP-WAN signaling. The LP-WAN application transfers the new UL network signaling to the selected network XCVRs over bus circuitry 430. The LP-WAN application interworks between LP-WAN data and user data for the UL and DL. The LP-WAN application transfers the UL user data to the selected network XCVRs over bus circuitry 430.

The BBU I/O receives the DL network signaling and user data from the selected network XCVRs over bus circuitry 430. The BBU CPU executes the network applications to process the DL network signaling and the DL user data to generate corresponding DL LP-WAN symbols that carry corresponding DL LP-WAN signaling and DL LP-WAN data. In radio 624, the DSP processes the DL LP-WAN symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LP-WAN signaling and DL LP-WAN data to LP-WAN UEs 601.

Figure 7:
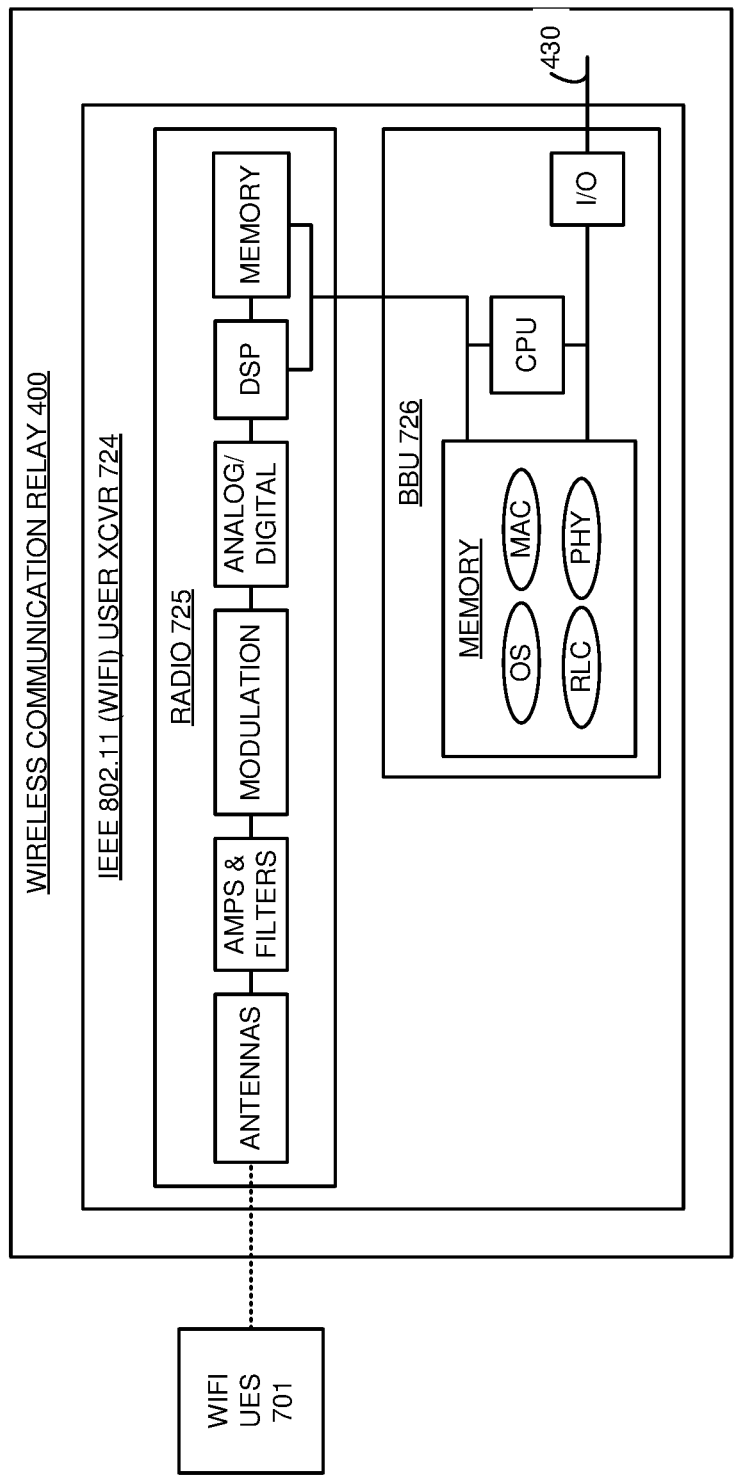
FIG. 7 illustrates an IEEE 802.11 (WIFI) user XCVR in the wireless communication relay.

FIG. 7 illustrates IEEE 802.11 (WIFI) user XCVR 724 in wireless communication relay 400. WIFI user XCVR 724 is an example of WIFI user XCVR 124, although XCVR 124 may differ. WIFI user XCVR 724 comprises radio 725 and BBU 726. Radio 725 comprises antennas, amplifiers, filters, modulation, analog-to-digital interfaces, DSP, and memory that are coupled over bus circuitry. BBU 726 comprises memory, CPU, and data I/O that are coupled over bus circuitry. In wireless communication relay 400, WIFI user XCVR 724 communicates over bus circuitry 430 with a set of network XCVRs as directed by test circuitry in relay 400. WIFI UEs 701 are wirelessly coupled to the antennas in radio 725 over WIFI links. Radio 725 and BBU 726 are coupled over bus circuitry. The BBU I/O is coupled to bus circuitry 430 which is coupled to other elements in wireless communication relay 400 like relay test circuitry and network XCVRs. The BBU memory stores an operating system, PHY, MAC, and RLC. The CPU executes the PHY, MAC, and RLC to drive the exchange of user data and network signaling between bus circuitry 430 and radio 725.

In radio 725, the antennas receive wireless WIFI signals from WIFI UEs 501 that transport UL WIFI signaling and UL WIFI data. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSP. The DSP recovers UL WIFI symbols from the UL digital signals. In BBU 726, the CPU executes the network applications to process the UL WIFI symbols and recover the UL WIFI signaling and UL WIFI data. The CPU executes the MAC to process the UL WIFI signaling and DL network signaling to generate new DL WIFI signaling and new UL network signaling. The RLC interworks between WIFI data and user data for the UL and DL. The RLC transfers the UL user data to the selected network XCVRs over bus circuitry 430.

The BBU I/O receives the DL user data over bus circuitry 430. The BBU CPU executes the network applications to process the new DL WIFI signaling and the DL WIFI data to generate corresponding DL WIFI symbols that carry the DL WIFI signaling and DL WIFI data. In radio 725, the DSP processes the DL WIFI symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless WIFI signals that transport the DL WIFI signaling and DL WIFI data to WIFI UEs 701.

Figure 8:
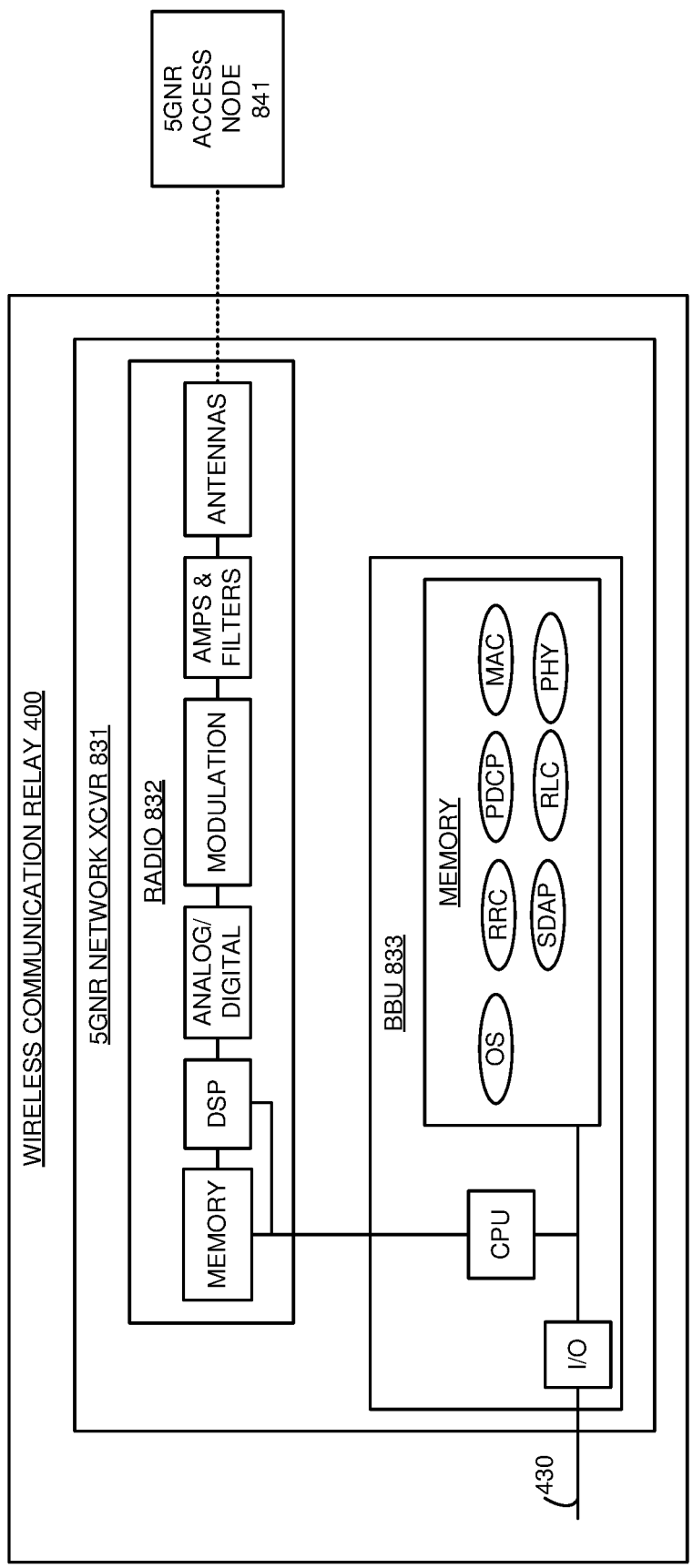
FIG. 8 illustrates a 5GNR network XCVR in the wireless communication relay.

FIG. 8 illustrates 5GNR network XCVR 831 in wireless communication relay 400. 5GNR network XCVR 831 is an example of 5GNR network XCVR 131, although XCVR 131 may differ. 5GNR network transceiver 831 comprises radio 832 and BBU 833 which are interconnected over bus circuitry. Radio 832 comprises antennas, amplifiers, filters, modulation, analog-to-digital interfaces, DSP, and memory that are coupled over bus circuitry. The antennas in 5GNR network transceiver 831 are wirelessly coupled to 5GNR access node 841. BBU 833 comprises data I/O, CPU, and memory. The BBU memory stores an operating system and network applications for PHY, MAC, RLC, PDCP, RRC, and SDAP. The CPU executes the operating system, RRC, and SDAP to exchange network signaling and user data with the assigned user XCVRs over bus circuitry 430. The CPU executes the operating system and network applications to wirelessly exchange 5GNR signaling and 5GNR data with 5GNR access node 841 over radio 832.

In radio 832, the antennas receive wireless 5GNR signals from 5GNR access node 841 that transport DL 5GNR signaling and DL 5GNR data. The antennas transfer corresponding electrical DL signals through duplexers to the amplifiers. The amplifiers boost the received DL signals for filters which attenuate unwanted energy. In modulation, demodulators down-convert the DL signals from their carrier frequency. The analog/digital interfaces convert the analog DL signals into digital DL signals for the DSP. The DSP recovers DL 5GNR symbols from the DL digital signals. The CPU executes the network applications (RRC, SDAP, PDCP, RLC, MAC, PHY) to process the DL 5GNR symbols and recover the DL 5GNR signaling and DL 5GNR data. The RRC transfers corresponding DL network signaling to the assigned user XCVRs over bus circuitry 430. The SDAP transfers corresponding DL user data to the assigned user XCVRs over bus circuitry 430.

In BBU 833, the SDAP receives UL user data from the assigned user XCVRs over bus circuitry 430. The RRC receives UL user signaling from the assigned user XCVRs over bus circuitry 430. The RRC processes the UL user signaling and the DL 5GNR signaling to generate corresponding DL user signaling and UL 5GNR signaling. The SDAP interworks between UL/DL user data and the UL/DL 5GNR data. The network applications (RRC, SDAP, PDCP, RLC, MAC, PHY) process the UL 5GNR signaling and the UL 5GNR data to generate corresponding UL 5GNR symbols. In radio 832, the DSP processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling and UL 5GNR data to 5GNR access node 841.

Figure 9:
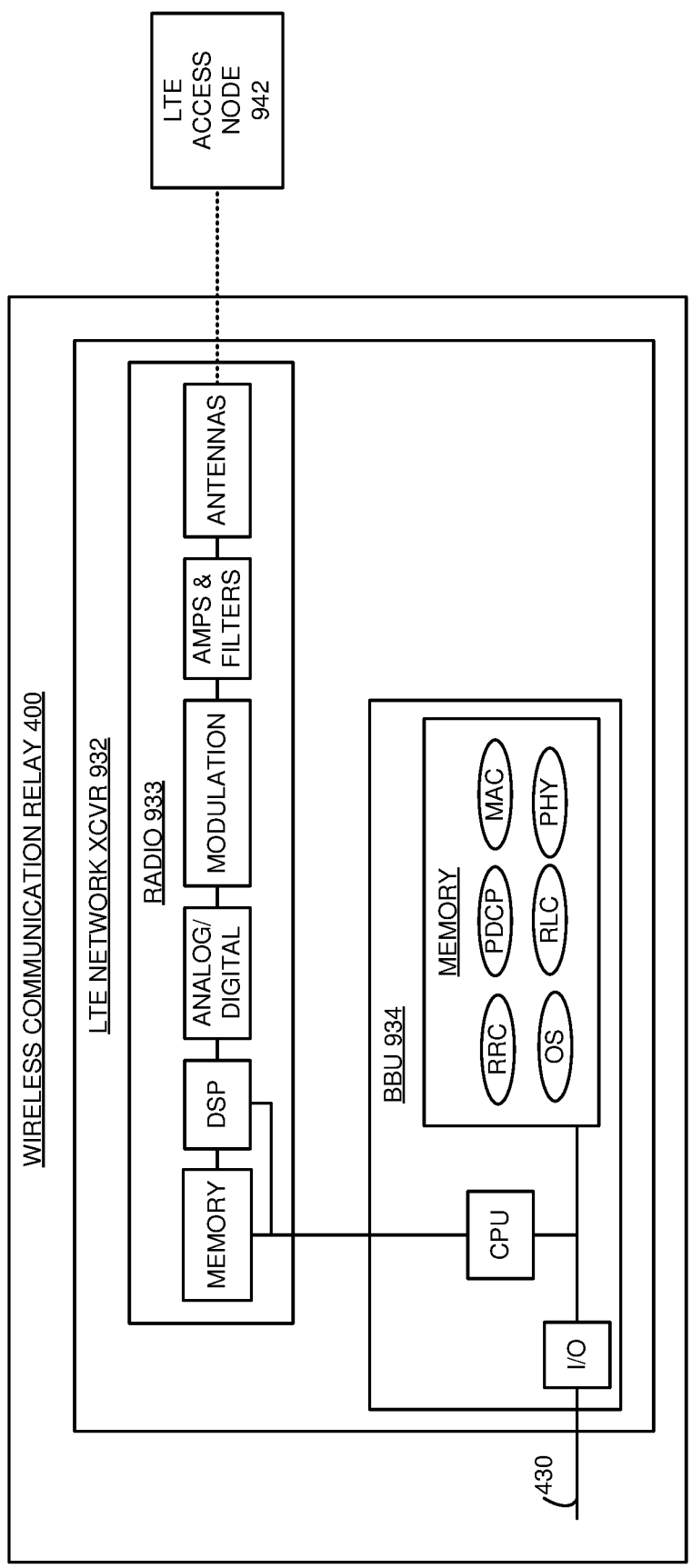
FIG. 9 illustrates an LTE network XCVR in the wireless communication relay.

FIG. 9 illustrates LTE network XCVR 932 in wireless communication relay 400. LTE network XCVR 932 is an example of LTE network XCVR 132, although XCVR 132 may differ. LTE network transceiver 932 comprises radio 933 and BBU 934 which are interconnected over bus circuitry. Radio 933 comprises antennas, amplifiers, filters, modulation, analog-to-digital interfaces, DSP, and memory that are coupled over bus circuitry. The antennas in LTE network XCVR 932 are wirelessly coupled to LTE access node 942. BBU 934 comprises data I/O, CPU, and memory. The BBU memory stores an operating system and network applications for PHY, MAC, RLC, PDCP, and RRC. The CPU executes the operating system, RRC, and PDCP to exchange network signaling and user data with user XCVRs 421, 522, 623, and 724 over bus circuitry 430. The CPU executes the operating system and network applications to wirelessly exchange LTE signaling and LTE data with LTE access node 942 over radio 933.

In radio 933, the antennas receive wireless LTE signals from LTE access node 942 that transport DL LTE signaling and DL LTE data. The antennas transfer corresponding electrical DL signals through duplexers to the amplifiers. The amplifiers boost the received DL signals for filters which attenuate unwanted energy. In modulation, demodulators down-convert the DL signals from their carrier frequency. The analog/digital interfaces convert the analog DL signals into digital DL signals for the DSP. The DSP recovers DL LTE symbols from the DL digital signals. The CPU executes the network applications (RRC, PDCP, RLC, MAC, PHY) to process the DL LTE symbols and recover the DL LTE signaling and DL LTE data. The RRC transfers corresponding DL network signaling to the assigned user XCVRs over bus circuitry 430. The PDCP transfers corresponding DL user data to the assigned user XCVRs over bus circuitry 430.

In BBU 934, the PDCP receives UL user data from the assigned user XCVRs over bus circuitry 430. The RRC receives UL user signaling from the assigned user XCVRs over bus circuitry 430. The RRC processes the UL user signaling and the DL LTE signaling to generate corresponding DL user signaling and UL LTE signaling. The PDCP interworks between UL/DL user data and the UL/DL LTE data. The network applications (RRC, PDCP, RLC, MAC, PHY) process the UL LTE signaling and the UL LTE data to generate corresponding UL LTE symbols. In radio 933, the DSP processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling and UL LTE data to LTE access node 942.

Figure 10:
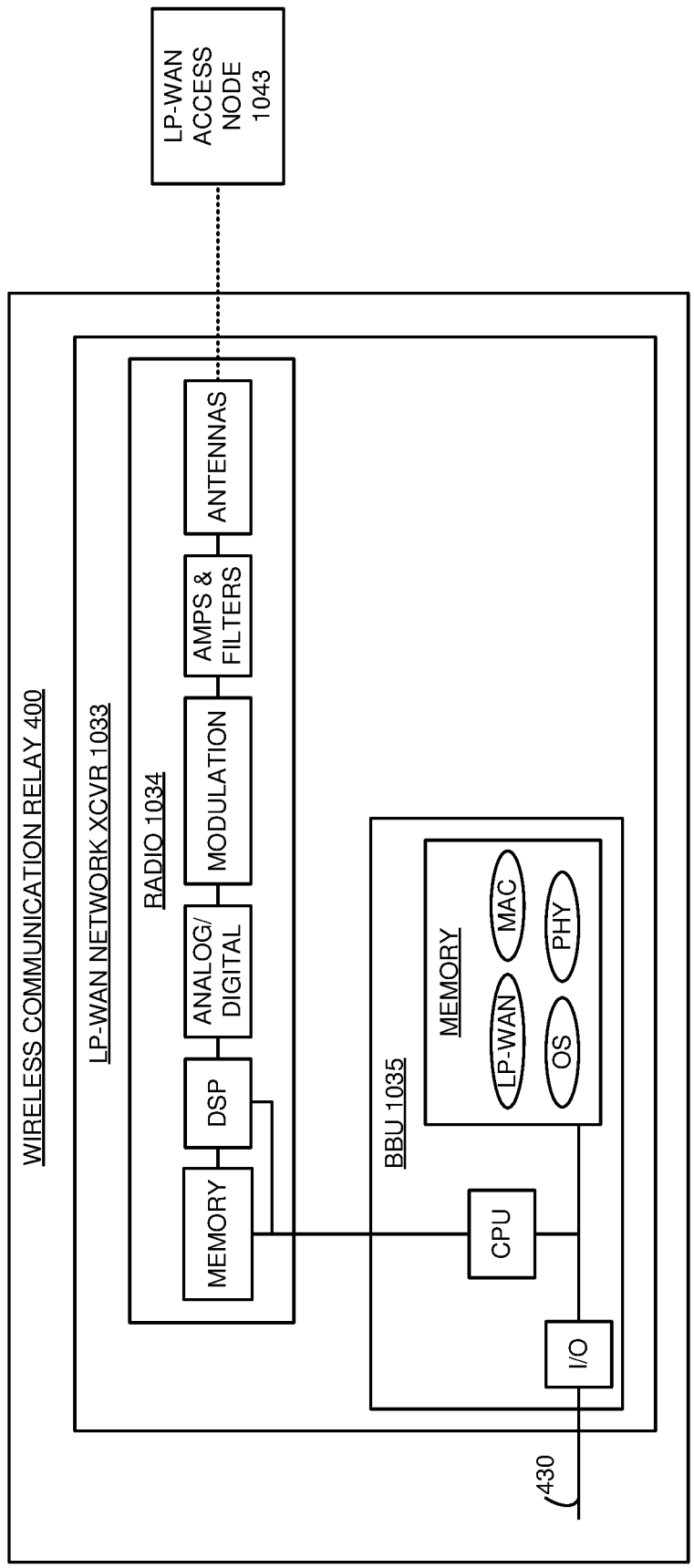
FIG. 10 illustrates an LP-WAN network XCVR in the wireless communication relay.

FIG. 10 illustrates LP-WAN network XCVR 1033 in wireless communication relay 400. LP-WAN network XCVR 1033 is an example of LP-WAN network XCVR 133, although XCVR 133 may differ. LP-WAN network transceiver 1033 comprises radio 1034 and BBU 1035 which are interconnected over bus circuitry. Radio 1034 comprises antennas, amplifiers, filters, modulation, analog-to-digital interfaces, DSP, and memory that are coupled over bus circuitry. The antennas in LP-WAN network XCVR 1033 are wirelessly coupled to LP-WAN access node 1043. BBU 1035 comprises data I/O, CPU, and memory. The BBU memory stores an operating system and network applications for PHY, MAC, and LP-WAN application. The CPU executes the operating system and LP-WAN application to exchange network signaling and user data with the assigned user XCVRs over bus circuitry 430. The CPU executes the operating system and network applications to wirelessly exchange LP-WAN signaling and LP-WAN data with LP-WAN access node 1043 over radio 1034.

In radio 1034, the antennas receive wireless LP-WAN signals from LP-WAN access node 1043 that transport DL LP-WAN signaling and DL LP-WAN data. The antennas transfer corresponding electrical DL signals through duplexers to the amplifiers. The amplifiers boost the received DL signals for filters which attenuate unwanted energy. In modulation, demodulators down-convert the DL signals from their carrier frequency. The analog/digital interfaces convert the analog DL signals into digital DL signals for the DSP. The DSP recovers DL LP-WAN symbols from the DL digital signals. The CPU executes the network applications (LP-WAN application, MAC, PHY) to process the DL LP-WAN symbols and recover the DL LP-WAN signaling and DL LP-WAN data. The LP-WAN application transfers corresponding DL network signaling to the assigned user XCVRs over bus circuitry 430. The LP-WAN application transfers corresponding DL user data to the assigned user XCVRs over bus circuitry 430.

In BBU 1035, the LP-WAN application receives UL user data and network signaling from the assigned user XCVRs over bus circuitry 430. The LP-WAN application processes the UL user signaling and the DL LP-WAN signaling to generate corresponding DL user signaling and UL LP-WAN application signaling. The LP-WAN application interworks between UL/DL user data and the UL/DL LP-WAN data. The network applications (LP-WAN application, MAC, PHY) process the UL LP-WAN signaling and the UL LP-WAN data to generate corresponding UL LP-WAN symbols. In radio 1034, the DSP processes the UL LP-WAN symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LP-WAN signals that transport the UL LP-WAN signaling and UL LP-WAN data to LP-WAN access node 1043.

Figure 11:
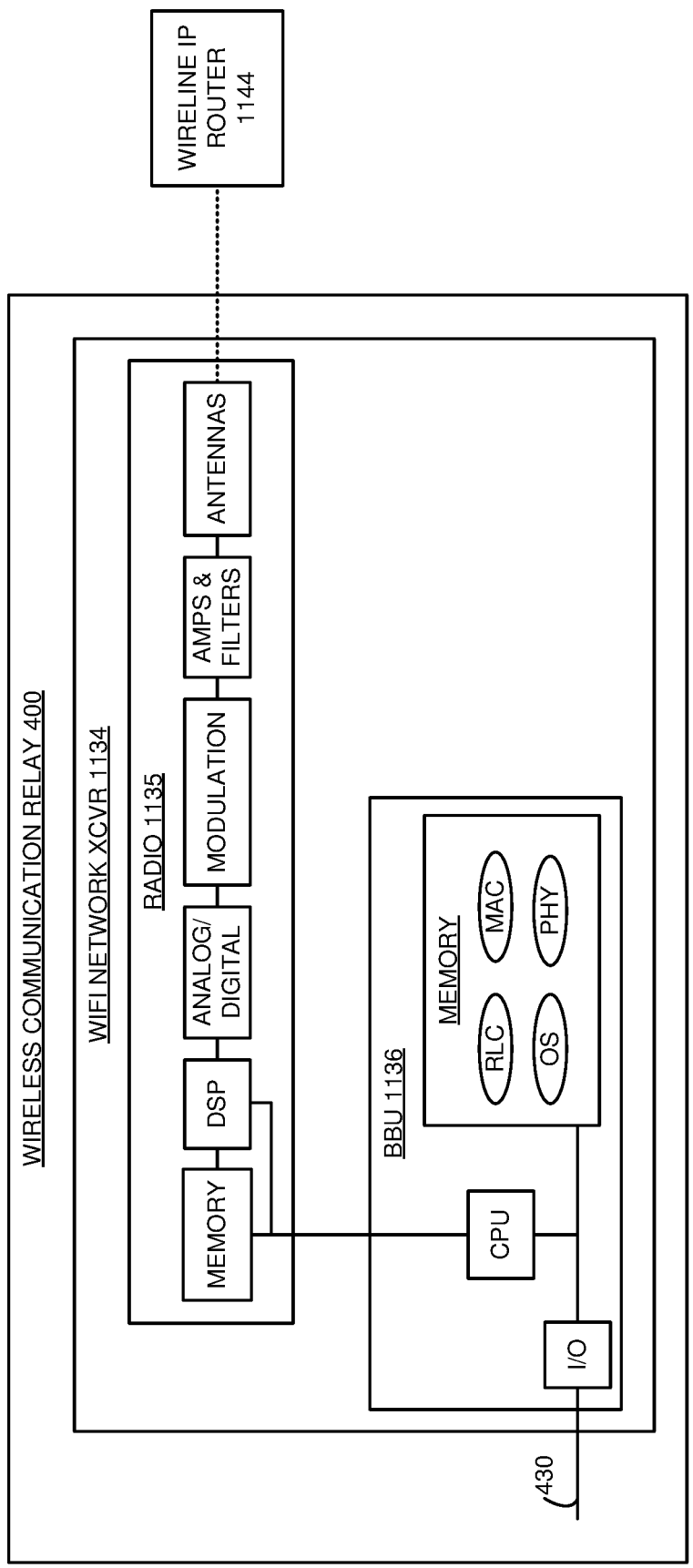
FIG. 11 illustrates a WIFI network XCVR in the wireless communication relay.

FIG. 11 illustrates WIFI network XCVR 1134 in wireless communication relay 400. WIFI network XCVR 1134 is an example of WIFI network XCVR 134, although XCVR 134 may differ. WIFI network transceiver 1134 comprises radio 1135 and BBU 1136 which are interconnected over bus circuitry. Radio 1135 comprises antennas, amplifiers, filters, modulation, analog-to-digital interfaces, DSP, and memory that are coupled over bus circuitry. The antennas in WIFI network XCVR 1134 are wirelessly coupled to wireline Internet Protocol (IP) router 1144 which has a WIFI interface. For example, wireline IP router 1144 may be a WIFI/DOCSIS interface that routes IP packets for a wireline Internet Service Provider (ISP). BBU 1136 comprises data I/O, CPU, and memory. The BBU memory stores an operating system and network applications for PHY, MAC, and RLC. The CPU executes the operating system and RLC to exchange network signaling and user data with the assigned user XCVRs over bus circuitry 430. The CPU executes the operating system and network applications to wirelessly exchange WIFI signaling and WIFI data with wireline IP router 1144 over radio 1135. In some examples, the WIFI data carries 5GNR, LTE, and/or LP-WAN signaling and data.

In radio 1135, the antennas receive wireless WIFI signals from the WIFI interface in wireline IP router 1144 that transport DL WIFI signaling and DL WIFI data. The antennas transfer corresponding electrical DL signals through duplexers to the amplifiers. The amplifiers boost the received DL signals for filters which attenuate unwanted energy. In modulation, demodulators down-convert the DL signals from their carrier frequency. The analog/digital interfaces convert the analog DL signals into digital DL signals for the DSP. The DSP recovers DL WIFI symbols from the DL digital signals. The CPU executes the network applications (RLC, MAC, PHY) to process the DL WIFI symbols and recover the DL WIFI signaling and DL WIFI data. The PHY transfers corresponding DL network signaling to the assigned user XCVRs over bus circuitry 430. The PHY transfers corresponding DL user data to user XCVRs 421, 522, 623, and 724 over bus circuitry 430.

In BBU 1136, the RLC receives UL user data and network signaling from the assigned user XCVRs over bus circuitry 430. The RLC processes the UL user signaling and the DL WIFI signaling to generate corresponding DL user signaling and UL WIFI signaling. The RLC interworks between UL/DL user data and the UL/DL WIFI data. The network applications (RLC, MAC, PHY) process the UL WIFI signaling and the UL WIFI data to generate corresponding UL WIFI symbols. In radio 1135, the DSP processes the UL WIFI symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless WIFI signals that transport the UL WIFI signaling and UL WIFI data to the WIFI interface in wireline IP router 1144.

Figure 12:
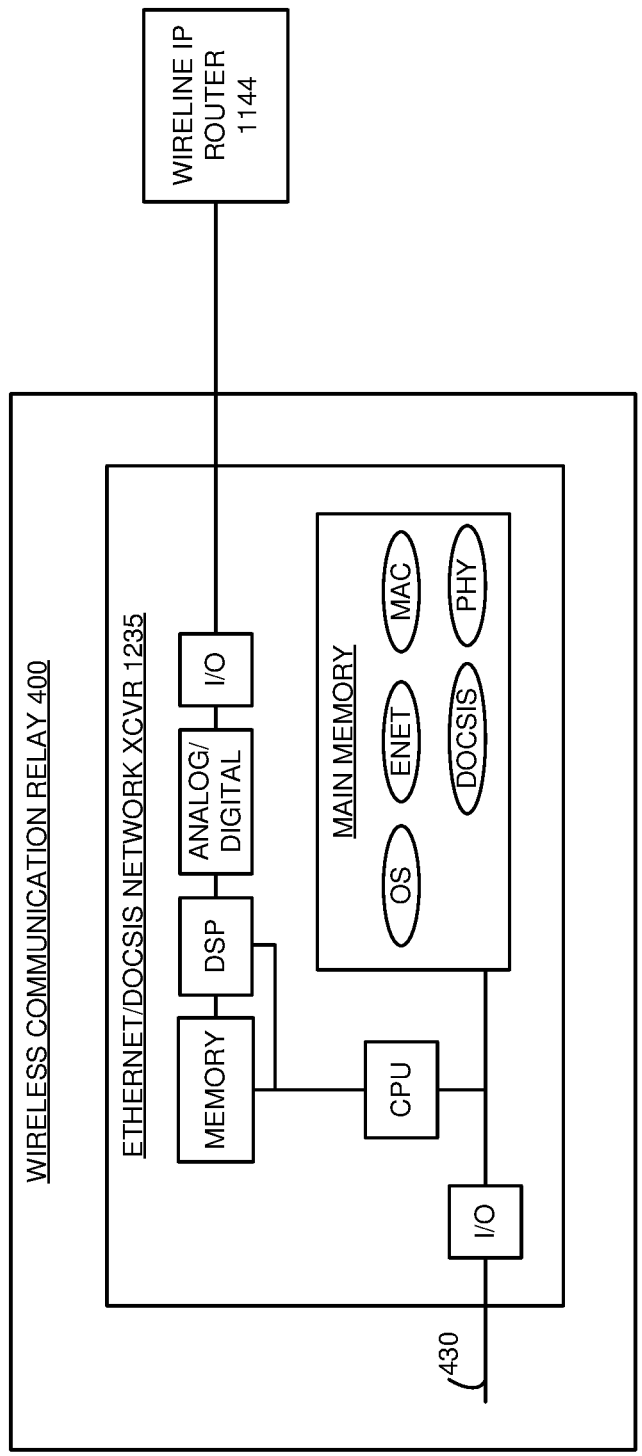
FIG. 12 illustrates an IEEE 802.3 (ETHERNET) and Data Over Cable System Interface Specification (DOCSIS) network XCVR in the wireless communication relay.

FIG. 12 illustrates IEEE 802.3 (ETHERNET) and Data Over Cable System Interface Specification (DOCSIS) network XCVR 1235 in wireless communication relay 400. Ethernet/DOCSIS XCVR is an example of network XCVR 135, although XCVR 135 may differ. The ETHERNET portion or the DOCSIS portion of network XCVR 1235 could be omitted in some examples. ETHERNET/DOCSIS network transceiver 1235 comprises data I/O, analog-to-digital interfaces, DSPs, memory, and CPUs that are coupled over bus circuitry. Some of the data I/O in ETHERNET/DOCSIS network XCVR 1235 is coupled to wireline Internet Protocol (IP) router 1144. For example, wireline IP router 1144 may be a DOCSIS interface that routes IP packets for a wireline Internet Service Provider (ISP). The main memory stores an operating system and network applications for PHY, MAC, ETHERNET, and DOCSIS. The CPU executes the operating system, the ETHERNET application, and the DOCSIS application to exchange network signaling and user data with the assigned user XCVRs over bus circuitry 430. The CPU executes the operating system and the network applications to exchange ETHERNET signaling and data with wireline IP router 1144. The CPU executes the operating system and network applications to exchange DOCSIS signaling and data with wireline IP router 1144. In some examples, the ETHERNET data and/or the DOCSIS data carry 5GNR, LTE, and/or LP-WAN signaling and data.

In network XCVR 1235, the data I/O receives data signals from wireline IP router 1144 that transport DL ETHERNET signaling and/or DOCSIS signaling and DL ETHERNET data and/or DL DOCSIS data. The data I/O transfers corresponding electrical DL signals to the analog/digital interfaces which convert the analog DL signals into digital DL signals for the DSP. The DSP recovers any DL ETHERNET signaling and data and recovers any DOCSIS signaling and data. The CPU executes the network applications (ETHERNET, DOCSIS, MAC, PHY) to transfer corresponding DL network signaling and corresponding DL user data to the assigned user XCVRs over bus circuitry 430.

In network XCVR 1235, the data I/O receives UL user data and network signaling from the assigned user XCVRs over bus circuitry 430. The ETHERNET and DOCSIS applications process the UL user signaling and the corresponding DL ETHERNET and DOCSIS signaling to generate corresponding DL user signaling and UL ETHERNET and DOCSIS signaling. The ETHERNET and DOCSIS applications interwork between UL/DL user data and UL/DL ETHERNET and DOCSIS data. The DSP processes the UL ETHERNET and DOCSIS signaling and data to generate corresponding digital UL signals for the analog-to-digital interfaces. The analog-to-digital interfaces convert the digital UL signals into analog UL signals. The data I/O transmits corresponding ETHERNET and DOCSIS signals that transport the UL ETHERNET and DOCSIS signaling and the UL ETHERNET and DOCSIS data to wireline IP router 1144.

Figure 13:
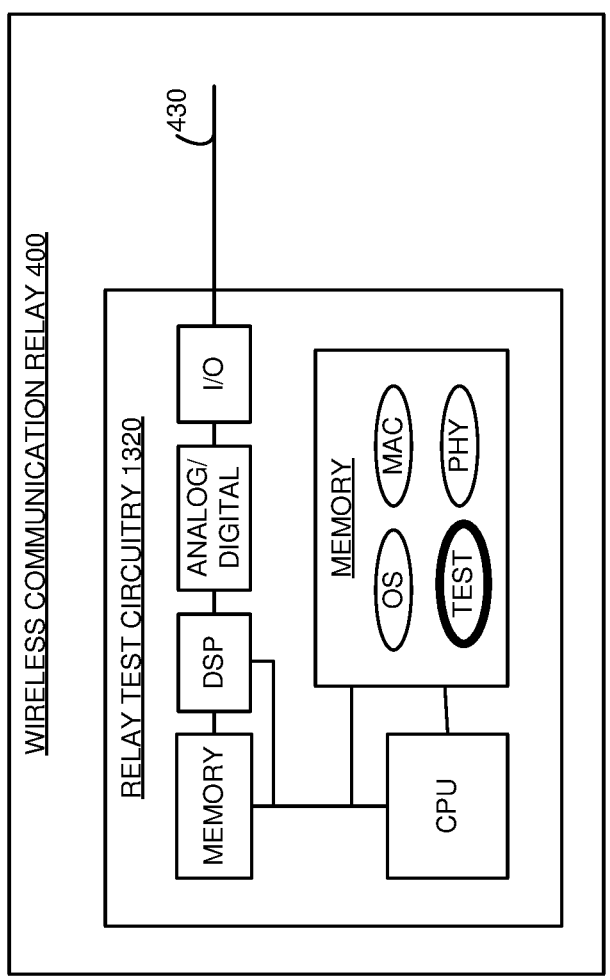
FIG. 13 illustrates relay test circuitry in the wireless communication relay.

FIG. 13 illustrates relay test circuitry 1320 in wireless communication relay 400. Relay test circuitry 1320 comprises data I/O, analog-to-digital interfaces, DSP, memory, and CPU that are coupled over bus circuitry. Relay test circuitry 1320 comprises an example of relay circuitry 120, although circuitry 120 may differ. The main memory stores an operating system and network applications for PHY, MAC, and throughput testing. The CPU executes the operating system and the network applications to exchange test signaling and test data with network XCVRs 831, 932, 1033, 1134, and 1235 over bus circuitry 430. The CPU executes the operating system and the TEST application to measure the throughput over network XCVRs 831, 932, 1033, 1134, and 1235—including separate tests for options like WIFI/LBO and WIFI/5GNR. The test application selects a set of network XCVRs 831, 932, 1033, 1134, and 1235 for each of the user XCVRs based on the throughput testing and based on selection instructions that are specific to each user XCVR. The test application signals each of the user XCVRs with their own selected set of network XCVRs 831, 932, 1033, 1134, and 1235.

Figure 14:
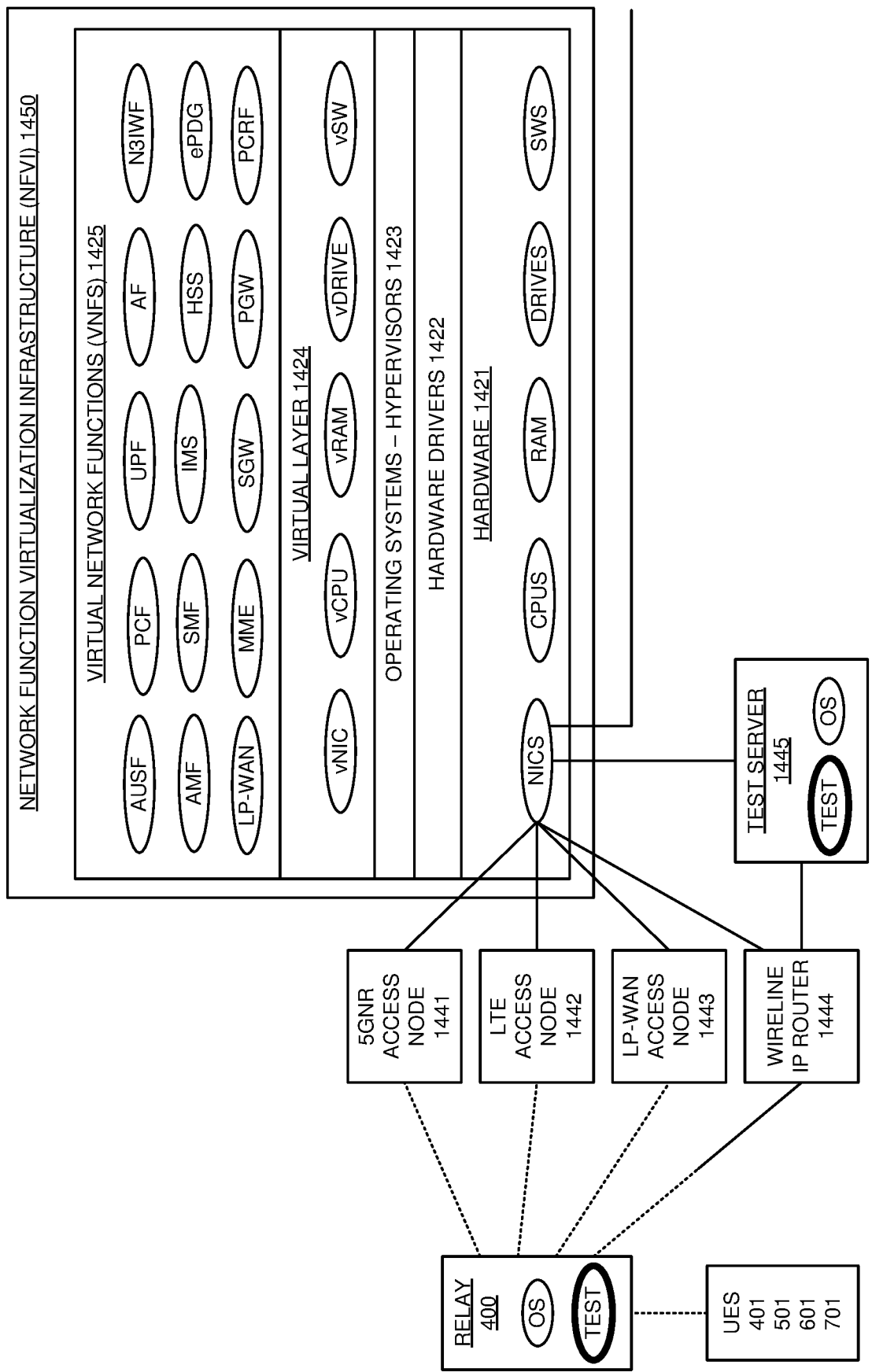
FIG. 14 illustrates a Network Function Virtualization Infrastructure (NFVI) that serves the wireless UEs over the wireless communication relay.
Figure 15:
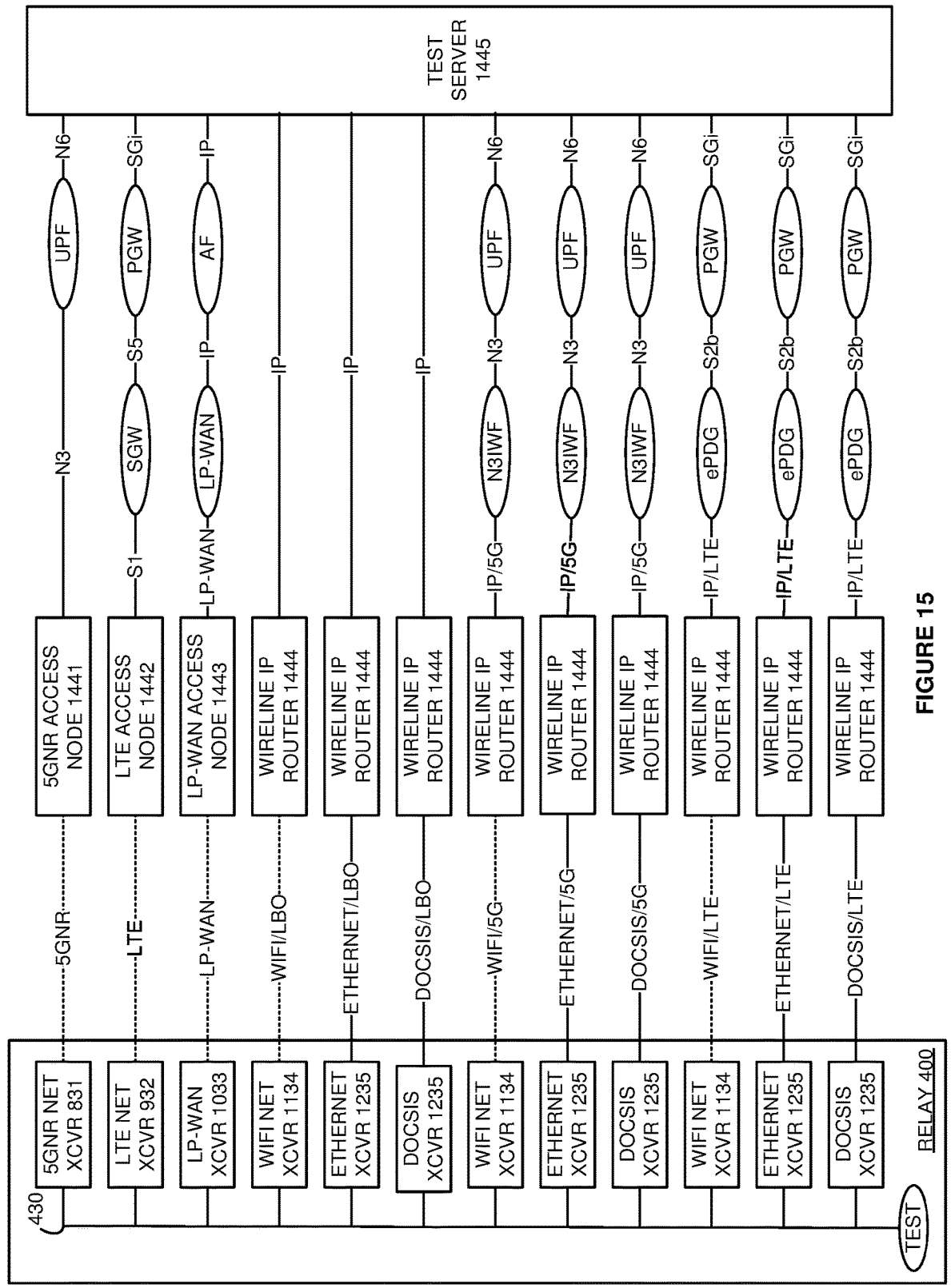
FIG. 15 illustrates test connections between the wireless communication relay and a test server.

FIG. 14 illustrates Network Function Virtualization Infrastructure (NFVI) 1450 that serves wireless UEs 401, 501, 601, and 701 over wireless communication relay 400. NFVI 420 is an example of networks 141-144, although networks 141-144 may differ. NFVI 1450 comprises hardware 1421, hardware drivers 1422, operating systems and hypervisors 1423, virtual layer 1424, and Virtual Network Functions (VNFs) 1425. Hardware 1421 comprises Network Interface Cards (NICs), CPUs, RAM, flash/disk drives, and data switches (SWS). Virtual layer 1424 comprises virtual NICs (vNIC), virtual CPUs (vCPU), virtual RAM (vRAM), virtual Drives (vDRIVE), and virtual Switches (vSW). The NICs are coupled to access nodes 1441-1443, router 1444, test server 1445, and other data systems over data links. VNFs 1425 comprise Authentication and Security Function (AUSF), Policy Control Function (PCF), User Plane Function (UPF), Application Function (AF), Access and Mobility Management Function (AMF), Session Management Function (SMF), N3 Interworking Function (N3IWF), Internet Protocol Multimedia Subsystem (IMS), Home Subscriber System (HSS), evolved Packet Data Gateway (ePDG), LP-WAN controller and gateway (LP-WAN), Mobility Management Entity (MME), Serving Gateway (SGW), Packet Data Network Gateway (PGW), and Policy Charging and Rules Function (PCRF). Other network functions are typically present but are omitted for clarity. Hardware 1421 executes hardware drivers 1422, operating systems and hypervisors 1423, virtual layer 1424, and VNFs 1425 to serve relay 400 and UEs 401, 501, 601, and 701 with data services. The data services include data connections to one another, test server 1445, and other data systems FIG. 15 illustrates test connections between wireless communication relay 400 and test server 1445. The user connections to other data systems would be similar. For illustrative purposes, the same device (like wireline IP router 1444) may be depicted multiple times on FIG. 15 where that device is re-used in the different test connections. The test connections are discussed from top to bottom.

A 5GNR test connection comprises bus circuitry 430, 5GNR network XCVR 831, wireless 5GNR link, 5GNR access node 1441, N3 link, UPF, and N6 link. The test application in relay 400 exchanges signaling with 5GNR network XCVR 831 which exchanges 5GNR signaling with 5GNR access node 1441 to establish the 5GNR test connection. The test application in relay 400 exchanges test data with test server 1445 over the 5GNR test connection and measures data throughput on the uplink and downlink in average bytes per second.

An LTE test connection comprises bus circuitry 430, LTE network XCVR 932, wireless LTE link, LTE access node 1442, S1 link, SGW, S5 link, PGW, and SGi link. The test application in relay 400 exchanges signaling with LTE network XCVR 932 which exchanges LTE signaling with LTE access node 1442 to establish the LTE test connection. The test application in relay 400 exchanges test data with test server 1445 over the LTE test connection and measures data throughput on the uplink and downlink in average bytes per second.

An LP-WAN test connection comprises bus circuitry 430, LP-WAN network XCVR 1033, wireless LP-WAN link, LP-WAN access node 1443, LP-WAN link, LP-WAN interface, IP link, AF, and IP link. The test application in relay 400 exchanges signaling with LP-WAN network XCVR 1033 which exchanges LP-WAN signaling with LP-WAN access node 1443 to establish the LP-WAN test connection. The test application in relay 400 exchanges test data with test server 1445 over the LP-WAN test connection and measures data throughput on the uplink and downlink in average bytes per second.

A WIFI/LBO test connection comprises bus circuitry 430, WIFI network XCVR 1134, wireless WIFI/LBO link, wireline IP router 1444, and IP link. The test application in relay 400 exchanges signaling with WIFI network XCVR 1134 which exchanges WIFI/IP signaling with wireline IP router 1444 to establish the WIFI/LBO test connection. The test application in relay 400 exchanges test data with test server 1445 over the WIFI/LBO test connection and measures data throughput on the uplink and downlink in average bytes per second.

An ETHERNET/LBO test connection comprises bus circuitry 430, ETHERNET network XCVR 1235, wireline ETHERNET/LBO link, wireline IP router 1444, and IP link. The test application in relay 400 exchanges signaling with ETHERNET network XCVR 1235 which exchanges ETHERNET/IP signaling with wireline IP router 1444 to establish the ETHERNET/LBO test connection. The test application in relay 400 exchanges test data with test server 1445 over the ETHERNET/LBO test connection and measures data throughput on the uplink and downlink in average bytes per second.

A DOCSIS/LBO test connection comprises bus circuitry 430, DOCSIS network XCVR 1235, wireline DOCSIS/LBO link, wireline IP router 1444, and IP link. The test application in relay 400 exchanges signaling with DOCSIS network XCVR 1235 which exchanges DOCSIS/IP signaling with wireline IP router 1444 to establish the DOCSIS/LBO test connection. The test application in relay 400 exchanges test data with test server 1445 over the DOCSIS/LBO test connection and measures data throughput on the uplink and downlink in average bytes per second.

A WIFI/5G test connection comprises bus circuitry 430, WIFI network XCVR 1134, wireless WIFI/5G link, wireline IP router 1444, IP/5G link, N3IWF, N3 link, UPF, and N6 link. The test application in relay 400 exchanges signaling with WIFI network XCVR 1134 which exchanges WIFI/IP signaling with wireline IP router 1444 to establish the WIFI/5G test connection to the N3IWF. The test application in relay 400 exchanges 5G signaling with the N3IWF to establish the WIFI/5G test connection from the N3IWF to test server 1445. The test application in relay 400 exchanges test data with test server 1445 over the WIFI/5G test connection and measures data throughput on the uplink and downlink in average bytes per second.

An ETHERNET/5G test connection comprises bus circuitry 430, ETHERNET network XCVR 1235, ETHERNET/5G link, wireline IP router 1444, IP/5G link, N3IWF, N3 link, UPF, and N6 link. The test application in relay 400 exchanges signaling with ETHERNET network XCVR 1235 which exchanges ETHERNET/IP signaling with wireline IP router 1444 to establish the ETHERNET/5G test connection to the N3IWF. The test application in relay 400 exchanges 5G signaling with the N3IWF to establish the ETHERNET/5G test connection from the N3IWF to test server 1445. The test application in relay 400 exchanges test data with test server 1445 over the ETHERNET/5G test connection and measures data throughput on the uplink and downlink in average bytes per second.

A DOCSIS/5G test connection comprises bus circuitry 430, DOCSIS network XCVR 1235, DOCSIS/5G link, wireline IP router 1444, IP/5G link, N3IWF, N3 link, UPF, and N6 link. The test application in relay 400 exchanges signaling with DOCSIS network XCVR 1235 which exchanges DOCSIS/IP signaling with wireline IP router 1444 to establish the DOCSIS/5G test connection to the N3IWF. The test application in relay 400 exchanges 5G signaling with the N3IWF to establish the DOCSIS/5G test connection from the N3IWF to test server 1445. The test application in relay 400 exchanges test data with test server 1445 over the DOCSIS/5G test connection and measures data throughput on the uplink and downlink in average bytes per second.

A WIFI/LTE test connection comprises bus circuitry 430, WIFI network XCVR 1134, wireless WIFI/LTE link, wireline IP router 1444, IP/LTE link, ePDG, S2b link, PGW, and SGi link. The test application in relay 400 exchanges signaling with WIFI network XCVR 1134 which exchanges WIFI/IP signaling with wireline IP router 1444 to establish the WIFI/LTE test connection to the ePDG. The test application in relay 400 exchanges LTE signaling with the ePDG to establish the WIFI/LTE test connection from the ePDG to test server 1445. The test application in relay 400 exchanges test data with test server 1445 over the WIFI/LTE test connection and measures data throughput on the uplink and downlink in average bytes per second.

An ETHERNET/LTE test connection comprises bus circuitry 430, ETHERNET network XCVR 1235, ETHERNET/LTE link, wireline IP router 1444, IP/LTE link, ePDG, S2b link, PGW, and SGi link. The test application in relay 400 exchanges signaling with ETHERNET network XCVR 1235 which exchanges ETHERNET/IP signaling with wireline IP router 1444 to establish the ETHERNET/LTE test connection to the ePDG. The test application in relay 400 exchanges LTE signaling with the ePDG to establish the ETHERNET/LTE test connection from the ePDG to test server 1445. The test application in relay 400 exchanges test data with test server 1445 over the ETHERNET/LTE test connection and measures data throughput on the uplink and downlink in average bytes per second.

A DOCSIS/LTE test connection comprises bus circuitry 430, DOCSIS network XCVR 1235, DOCSIS/LTE link, wireline IP router 1444, IP/LTE link, ePDG, S2b link, PGW, and SGi link. The test application in relay 400 exchanges signaling with DOCSIS network XCVR 1235 which exchanges DOCSIS/IP signaling with wireline IP router 1444 to establish the DOCSIS/LTE test connection to the ePDG. The test application in relay 400 exchanges LTE signaling with the ePDG to establish the DOCSIS/LTE test connection from the ePDG to test server 1445. The test application in relay 400 exchanges test data with test server 1445 over the DOCSIS/LTE test connection and measures data throughput on the uplink and downlink in average bytes per second.

Wireless relay 400 may establish user connections in a similar manner as the test connections, but relay 400 uses user-selected destinations for the user connections instead of the test server 1445.

The test application in relay 400 may enters the data throughput test results into a data structure that yields the selected network XCVRs and connection options for each user XCVR. For 5GNR user XCVR 421, the test application may select 5GNR network XCVR 831 for a 5GNR user connection and WIFI network XCVR 1134 for a WIFI/5G user connection. For LTE user XCVR 522, the test application may select LTE network XCVR 932 for an LTE user connection and 5GNR network XCVR 831 for a 5GNR user connection. For LP-WAN user XCVR 623, the test application may select LP-WAN network XCVR 1033 for an LP-WAN user connection and ETHERNET network XCVR 1235 for an ETHERNET/LBO user connection. For WIFI user XCVR 724, the test application may select WIFI network XCVR 1134 for a WIFI/LBO user connection and ETHERNET network XCVR 1235 for an ETHERNET/5G user connection. These selections are exemplary and the test application in relay 400 may make other selections.

The wireless data network circuitry described above comprises computer hardware and software that form special-purpose network circuitry to serve wireless user devices over a wireless communication relay that has multiple network XCVRs. The computer hardware comprises processing circuitry like CPUs, DSPs, GPUs, XCVRs, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, XCVRs, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless user devices over a wireless communication relay that has multiple network XCVRs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication relay to wirelessly serve wireless User Equipment (UEs) with wireless data service, the method comprising:
    relay circuitry testing data throughputs over a Fifth Generation New Radio (5GNR) network XCVR, a Long Term Evolution (LTE) network XCVR, and a wireline network XCVR;
    the relay circuitry selecting ones of the 5GNR network XCVR, the LTE network XCVR, and the wireline network XCVR based on the data throughput testing and indicating the selected ones of the 5GNR network XCVR, the LTE network XCVR, and the wireline network XCVR to the 5GNR user XCVR and the LTE user XCVR;
    the 5GNR user XCVR and the LTE user XCVR wirelessly exchanging user data with the wireless UEs and exchanging the user data with the selected ones of the 5GNR network XCVR, the LTE network XCVR, and the wireline network XCVR; and
    the selected ones of the 5GNR network XCVR, the LTE network XCVR, and the wireline network XCVR exchanging the user data with one or more data communication networks.

2. The method of claim 1 wherein the wireline network XCVR comprises an Institute of Electrical and Electronic Engineers (IEEE) 802.3 (ETHERNET) XCVR.

3. The method of claim 1 wherein the wireline network XCVR comprises an Institute of Electrical and Electronic Engineers (IEEE) 802.11 (WIFI) XCVR.

4. The method of claim 1 wherein the wireline network XCVR comprises a Data Over Cable System Interface Specification (DOCSIS) XCVR.

5. The method of claim 1 wherein the test circuitry testing the data throughputs over the wireline network XCVR comprises testing the data throughput over a connection through a Local Break-Out (LBO) router.

6. The method of claim 1 wherein the test circuitry testing the data throughputs over the wireline network XCVR comprises testing the data throughput over a connection through at least one of an N3 Interworking Function (N3IWF) and an Evolved Packet Data Gateway (ePDG).

7. The method of claim 1 further comprising the test circuitry testing data throughputs over a Low-Power Wide Area Network (LP-WAN) network XCVR; and wherein
the test circuitry selecting and indicating ones of the 5GNR network XCVR, the LTE network XCVR, and the wireline network XCVR comprises selecting and indicating ones of the 5GNR network XCVR, the LTE network XCVR, the wireline network XCVR, and the LP-WAN network XCVR based on the data throughput testing;
the 5GNR user XCVR and the LTE user XCVR exchanging the user data comprises exchanging the user data with the selected ones of the 5GNR network XCVR, the LTE network XCVR, the wireline network XCVR, and the LP-WAN network XCVR; and
the selected ones of the 5GNR network XCVR, the LTE network XCVR, and the wireline network XCVR exchanging the user data comprises the selected ones of the 5GNR network XCVR, the LTE network XCVR, the wireline network XCVR, and the LP-WAN network XCVR exchanging the user data.

8. The method of claim 1 further comprising the test circuitry testing data throughputs over an Institute of Electrical and Electronic Engineers (IEEE) 802.11 (WIFI) network XCVR; and wherein
the test circuitry selecting and indicating ones of the 5GNR network XCVR, the LTE network XCVR, and the wireline network XCVR comprises selecting and indicating ones of the 5GNR network XCVR, the LTE network XCVR, and the WIFI network XCVR based on the data throughput testing;
the 5GNR user XCVR and the LTE user XCVR exchanging the user data comprises exchanging the user data with the selected ones of the 5GNR network XCVR, the LTE network XCVR, and the WIFI network XCVR; and
the selected ones of the 5GNR network XCVR, the LTE network XCVR, and the wireline network XCVR exchanging the user data comprises the selected ones of the 5GNR network XCVR, the LTE network XCVR, and the WIFI network XCVR exchanging the user data.

9. The method of claim 1 further comprising
the test circuitry indicating the selected ones of the 5GNR network XCVR, the LTE network XCVR, and the wireline network XCVR to a Low-Power Wide Area Network (LP-WAN) user XCVR; and
the LP-WAN user XCVR wirelessly exchanging other user data with other wireless User Equipment (UEs) and exchanging the other user data with the selected ones of the 5GNR network XCVR, the LTE network XCVR, and the wireline network XCVR.

10. The method of claim 1 further comprising:
the test circuitry indicating the selected ones of the 5GNR network XCVR, the LTE network XCVR, and the wireline network XCVR to an Institute of Electrical and Electronic Engineers (IEEE) 802.11 (WIFI) user XCVR; and
the WIFI user XCVR wirelessly exchanging other user data with the wireless User Equipment (UEs) and exchanging the other user data with the selected ones of the 5GNR network XCVR, the LTE network XCVR, and the wireline network XCVR.

11. A wireless communication relay to wirelessly serve wireless User Equipment (UEs) with wireless data service, the wireless communication relay comprising:
relay circuitry configured to test data throughputs over a Fifth Generation New Radio (5GNR) network XCVR, a Long Term Evolution (LTE) network XCVR, and a wireline network XCVR;
the relay circuitry configured to select ones of the 5GNR network XCVR, the LTE network XCVR, and the wireline network XCVR based on the data throughput testing and indicate the selected ones of the 5GNR network XCVR, the LTE network XCVR, and the wireline network XCVR to the 5GNR user XCVR and the LTE user XCVR;
the 5GNR user XCVR and the LTE user XCVR configured to wirelessly exchange user data with the wireless UEs and exchange the user data with the selected ones of the 5GNR network XCVR, the LTE network XCVR, and the wireline network XCVR; and
the selected ones of the 5GNR network XCVR, the LTE network XCVR, and the wireline network XCVR configured to exchange the user data with one or more data communication networks.

12. The wireless communication relay of claim 11 wherein the wireline network XCVR comprises an Institute of Electrical and Electronic Engineers (IEEE) 802.3 (ETHERNET) XCVR.

13. The wireless communication relay of claim 11 wherein the wireline network XCVR comprises an Institute of Electrical and Electronic Engineers (IEEE) 802.11 (WIFI) XCVR.

14. The wireless communication relay of claim 11 wherein the wireline network XCVR comprises a Data Over Cable System Interface Specification (DOCSIS) XCVR.

15. The wireless communication relay of claim 11 wherein the test circuitry is configured to test the data throughput over a connection through a Local Break-Out (LBO) router.

16. The wireless communication relay of claim 11 wherein the test circuitry is configured to test the data throughput over a connection through at least one of an N3 Interworking Function (N3IWF) and an Evolved Packet Data Gateway (ePDG).

17. The wireless communication relay of claim 11 further comprising the test circuitry configured to test data throughputs over a Low-Power Wide Area Network (LP-WAN) network XCVR and wherein:
the test circuitry is configured to select and indicate ones of the 5GNR network XCVR, the LTE network XCVR, the wireline network XCVR, and the LP-WAN network XCVR based on the data throughput testing;
the 5GNR user XCVR and the LTE user XCVR are configured to exchange the user data with the selected ones of the 5GNR network XCVR, the LTE network XCVR, the wireline network XCVR, and the LP-WAN network XCVR; and
the selected ones of the 5GNR network XCVR, the LTE network XCVR, the wireline network XCVR, and the LP-WAN network XCVR are configured to exchange the user data.

18. The wireless communication relay of claim 11 further comprising the test circuitry configured to test data throughputs over an Institute of Electrical and Electronic Engineers (IEEE) 802.11 (WIFI) network XCVR and wherein:

the test circuitry is configured to select and indicate ones of the 5GNR network XCVR, the LTE network XCVR, and the WIFI network XCVR based on the data throughput testing;

the 5GNR user XCVR and the LTE user XCVR are configured to exchange the user data with the selected ones of the 5GNR network XCVR, the LTE network XCVR, and the WIFI network XCVR; and the selected ones of the 5GNR network XCVR, the LTE network XCVR, and the WIFI network XCVR are configured to exchange the user data.

19. The wireless communication relay of claim 11 further comprising:

the test circuitry configured to indicate the selected ones of the 5GNR network XCVR, the LTE network XCVR, and the wireline network XCVR to a Low-Power Wide Area Network (LP-WAN) user XCVR; and the LP-WAN user XCVR configured to wirelessly exchange other user data with other wireless User Equipment (UEs) and exchange the other user data with the selected ones of the 5GNR network XCVR, the LTE network XCVR, and the wireline network XCVR.

20. The wireless communication relay of claim 11 further comprising:

the test circuitry configured to indicate the selected ones of the 5GNR network XCVR, the LTE network XCVR, and the wireline network XCVR to an Institute of Electrical and Electronic Engineers (IEEE) 802.11 (WIFI) user XCVR; and the WIFI user XCVR configured to wirelessly exchange other user data with the wireless User Equipment (UEs) and exchange the other user data with the selected ones of the 5GNR network XCVR, the LTE network XCVR, and the wireline network XCVR.

* * * * *